United States Patent
McNamara et al.

(10) Patent No.: US 10,902,389 B1
(45) Date of Patent: Jan. 26, 2021

(54) NETWORK COMPUTING SYSTEM EXECUTING PROGRAMMATIC ADAPTERS TO IMPLEMENT ASYNCHRONOUS COMMUNICATIONS

(71) Applicant: Ripple Labs Inc., San Francisco, CA (US)

(72) Inventors: Conner McNamara, San Francisco, CA (US); Dadi Armannsson, San Francisco, CA (US); Gunnar Kristjansson, San Francisco, CA (US)

(73) Assignee: Ripple Labs Inc., San Francisco, CA (US)

( * ) Notice: Subject to any disclaimer, the term of this patent is extended or adjusted under 35 U.S.C. 154(b) by 0 days.

(21) Appl. No.: 16/797,565

(22) Filed: Feb. 21, 2020

Related U.S. Application Data

(60) Provisional application No. 62/950,791, filed on Dec. 19, 2019.

(51) Int. Cl.
   *G06Q 20/10* (2012.01)
   *G06F 9/50* (2006.01)
   *H04L 29/08* (2006.01)
   *G06Q 20/20* (2012.01)

(52) U.S. Cl.
   CPC ......... *G06Q 20/10* (2013.01); *G06F 9/5061* (2013.01); *G06Q 20/209* (2013.01); *H04L 67/2842* (2013.01); *H04L 69/329* (2013.01)

(58) Field of Classification Search
   None
   See application file for complete search history.

(56) References Cited

U.S. PATENT DOCUMENTS

| | | | |
|---|---|---|---|
| 8,181,071 B2 | 5/2012 | Cahill et al. | |
| 8,626,653 B1 | 1/2014 | Krikorian et al. | |
| 10,269,009 B1 | 4/2019 | Winklevoss et al. | |
| 2002/0087454 A1* | 7/2002 | Calo | G06O 30/06 705/37 |
| 2002/0156718 A1* | 10/2002 | Olsen | G06Q 40/00 705/37 |
| 2005/0154674 A1 | 7/2005 | Nicholls et al. | |
| 2009/0248574 A1* | 10/2009 | Leung | G06Q 40/02 705/39 |
| 2010/0280936 A1 | 11/2010 | Trickey et al. | |
| 2013/0031002 A1 | 1/2013 | Hibbard | |
| 2014/0156512 A1 | 6/2014 | Rahman et al. | |
| 2017/0228704 A1 | 8/2017 | Zhou et al. | |
| 2017/0270527 A1 | 9/2017 | Rampton | |
| 2019/0095992 A1* | 3/2019 | Soh | G07F 19/20 |
| 2020/0111086 A1* | 4/2020 | Castinado | G06Q 20/10 |

* cited by examiner

*Primary Examiner* — Alexandru Cirnu
(74) *Attorney, Agent, or Firm* — Mahamedi IP Law LLP

(57) ABSTRACT

A computing system can establish asynchronous network communications with exchanges to facilitate cross-medium transactions between originating and recipient clients. Such communications can result in filtering out errant responses that would otherwise cause an open transaction to fail.

20 Claims, 10 Drawing Sheets

NETWORK COMPUTING SYSTEM EXECUTING PROGRAMMATIC ADAPTERS TO IMPLEMENT ASYNCHRONOUS COMMUNICATIONS

CROSS-REFERENCE TO RELATED APPLICATION

This application claims the benefit of priority to U.S. Provisional Patent Application No. 62/950,791, filed on Dec. 19, 2019, which is hereby incorporated by reference in its entirety.

BACKGROUND

The foreign exchange market determines exchange rates between value mediums (e.g., currencies) and comprises the largest market in the world. Typically, the foreign exchange market works through financial institutions that facilitate continuous trading of currencies for central banks, commercial companies, investment management firms, retail traders, and the like and consequently establish the dynamic floating exchange rates between different currencies.

In typical arrangements, a pair of financial institutions operating with different primary value mediums (e.g., U.S. dollars versus Mexican Pesos) will have a nostro account holding a significant balance of the foreign value medium with the other institution to provide the necessary liquidity for such cross-medium transactions. In this arrangement, the nostro account is used for the ability to pay and receive the domestic currency of the counterpart institution, and can be debited and credited for business transactions involving the counterpart institution in the foreign currency.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
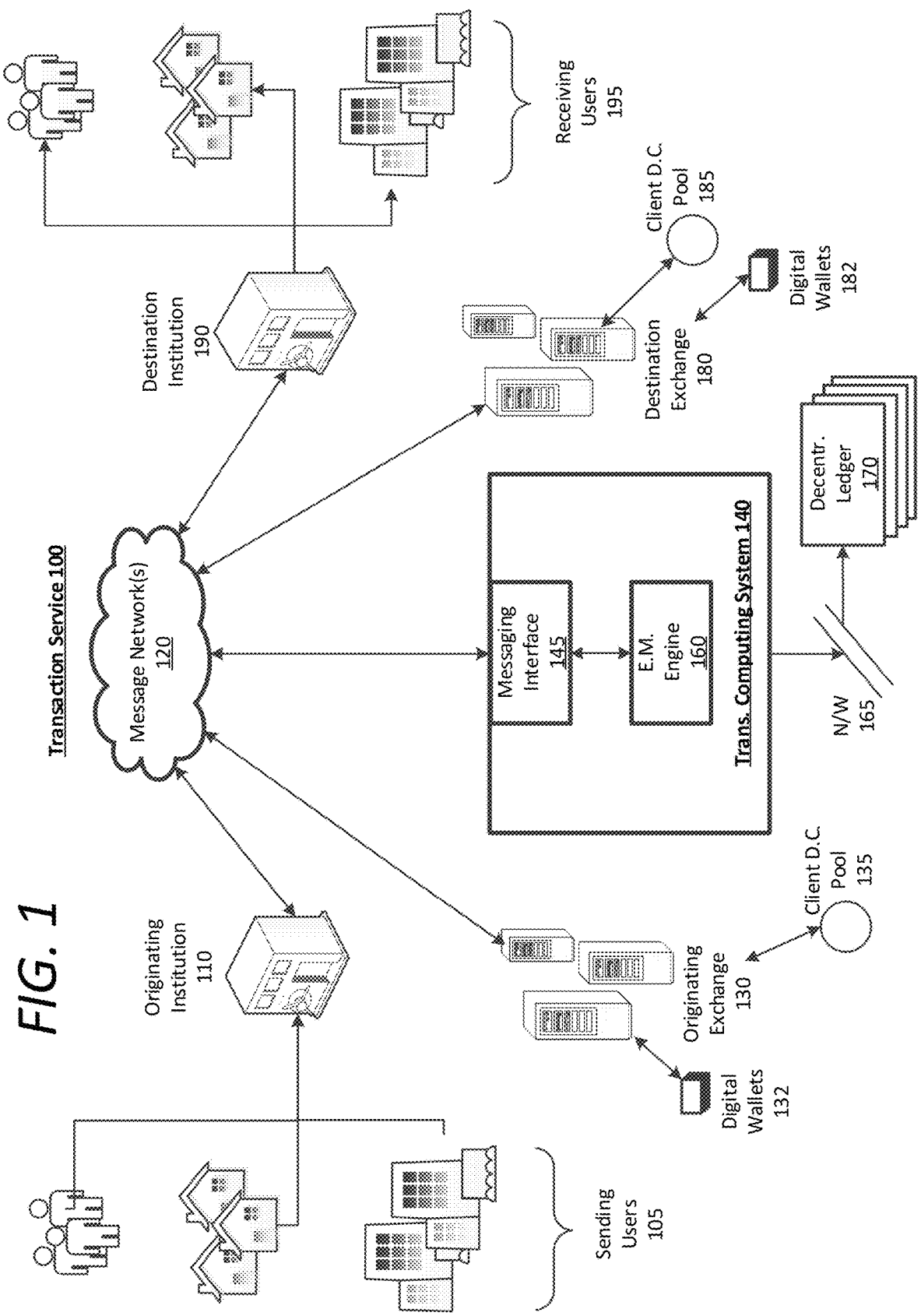
FIG. 1 is a block diagram illustrating an example transaction service providing on-demand liquidity, according to examples described herein.

Cross-medium exchanges typically involve a valuation of each medium (e.g., two different currencies) and one or more trusted entities to facilitate the exchanges (e.g., financial institutions). For foreign currency exchange between institutions that primarily use their home currencies, a first bank operating with one primary currency (e.g., Mexican Pesos) will maintain a nostro account of the other bank's currency (e.g., U.S. dollars) and vice versa. The purpose of the nostro account is to maintain parked liquid money of the other's currency in order to facilitate the settlement of the currency exchanges between the two banks. The amount held in each nostro account can depend on an estimate of the amount of currency to be exchanged between the two banks over a given time period (e.g., one day). Accordingly, nostro accounts have provided a solution for banking institutions to receive deposits, make payments, and handle other financial transactions for other banking institutions operating under different primary currencies. By providing this liquidity, international transacting entities (e.g., multi-national corporations) have the ability to rely on one banking institution to facilitate their transaction needs throughout the world (e.g., through bilateral agreements between banks).

However, by having money parked in nostro accounts in multiple financial institutions throughout the world, a banking institution must tolerate a significant amount of undeployed or uninvested money for such cross-medium exchanges. That is, this money must remain liquid in nostro accounts—enabling direct debiting by the counterpart institution (e.g., through SWIFT MT103 secure messaging)—instead of being loaned, invested, or deployed in other illiquid profit-making ventures. Current estimates indicate that on the order of ten trillion U.S. dollars in value is used as parked float sitting in nostro or other correspondent accounts throughout the world. Furthermore, any pair of banks that do not have an agreement regarding such exchanges must use other banks that do, which can drive up transaction fees and complexity.

To address these inefficiencies, certain banks will implement deferred aggregate settlement systems, where banking institutions will create an arrangement in which transactions are aggregated until a settlement interval (e.g., at a certain time every day). At this time, the net amount of the transactions is settled, which may enable these banks to hold lower balances in their nostro accounts at the other banks (e.g., by transferring funds to and from the nostro accounts after the settlement interval). However, this exposes each transaction to a delay and, as a consequence, injects uncertainty and risk into the system.

Additional problems and inefficiencies that exist in the medium exchange industries involve exchange rate guarantees, which are typically not possible until the time of settlement. This problem has typically been treated with guaranteed exchange ranges, which can either be tolerated by exchanging parties or rejected. Furthermore, since exchange rates can vary in-real-time, the exposure to exchange rate volatility increases significantly due to settlement delays lasting upwards of several days. Accordingly, one aspiring method to address the problem of exchange rate guarantees is to significantly decrease the settlement time.

With the advent of digital currencies and decentralized ledgers, the use of nostro accounts may be largely eliminated, releasing the parked money therein to be deployed by the banking institutions accordingly, as described herein. A computing system is provided herein that implements a cross-medium transaction service by leveraging the use of a digital currency and ledger (e.g., a decentralized, distributed ledger) to replace the need for clearing houses and/or nostro/vostro accounts. This cross-medium transaction system operates to provide on-demand liquidity for cross-medium exchanges such that fund settlements can occur at any time within seconds or fractions of a second, as opposed to several days in the current implementations. As such, the computing system implements real-time gross settlement, and is not limited to banking institutions or currencies, but may rather be implemented for any exchange of value (e.g., commodities, other digital currencies and assets, bonds, stocks, securities, etc.).

The computing system can comprise a client interface (e.g., an application programming interface) to communicate with client computing devices (e.g., via an executing transaction service application executing on these client computing devices). The client may be a financial institution or may be associated with any financial institution in which the client has an account. At any given time, a client may execute the transaction service application to transfer a certain value of a medium (e.g., a U.S. dollar amount) to another client in a different medium (e.g., South African Rands). Such a transaction may be for any reason, such as the two clients simply living in two different countries and utilizing their respective countries' currency.

Through a user interface of the transaction service application, the sending client can select or input an identifier of the receiving client (e.g., selecting the receiving client from a contact list) and a transaction amount in the sending client's home currency or any other value medium. The sending client may then submit the transaction request, which can be received by the computing system described herein. Upon receiving the transaction request, the computing system can perform a dynamic exchange rate lookup between the sending medium and receiving medium, and optionally provide the current exchange rate to the sending and/or receiving client (e.g., via the executing transaction service app). In certain aspects, the transaction service can maintain its own live exchange rate database that receives exchange rate data from any number of sources, such as central banks, institutional banks, commodities exchanges, stock exchanges, third-party exchange monitoring entities, and the like. In variations, the computing system can transmit quote requests to originating and destination exchanges and provide the quotes back to the client(s).

In certain implementations, when a transaction request is received from the sending client, the computing system can execute the transaction in seconds or fractions of a second, with the processes described herein occurring in this timeframe. The transaction amount in the sending medium (e.g., U.S. dollars) can be immediately withdrawn from the sending client's account with a particular financial institution. The withdrawn amount is exchanged for the digital currency of the transaction service at an originating exchange, and then transferred to a destination exchange of the receiving client. At the destination exchange, the digital currency is converted to the receiving client's value medium (e.g., South African Rands) and transferred to an account of the receiving client's financial institution. The result is a very near real-time transaction at or very near the exchange rate at the time of request.

It is contemplated that the settlement amount may vary slightly from the request amount due to the slight time delay (e.g., a few seconds) in the transaction process. This variation may be due to the exchange rate for the sending and receiving mediums experiencing volatility and varying during this time, and/or the respective exchange rates of the digital currency versus the sending and receiving value mediums. To address this volatility variation, the computing system can maintain a customer pool with a certain amount of the digital currency at each originating and/or destination exchange. In order to guarantee the exchange rate between the sending and receiving mediums at the time of the transaction request, the computing system can withdraw or deposit the difference between the guaranteed amount and the transferred amount (minus fees) to and from this client pool. Accordingly, as transactions at the destination exchanges are performed (i.e., converting the digital currency to the destination value medium), the computing system can withdraw and deposit the volatility differences for each transaction to and from the client pool as needed.

In certain implementations, the computing system can facilitate on-demand liquidity for cross-medium transactions using exchange account adapters that provide asynchronous exchange interactions in order to prevent failed transactions. It is contemplated that the transaction hardware architecture from end-to-end will have reliance on the computing infrastructure of the exchanges, which can experience downtime for any reason (e.g., hacks, upgrades, system maintenance, etc.). Accordingly, direct messaging between an exchange management engine of the computing system and the computing systems of exchanges themselves may result in errant responses from the exchanges, which can result in failed transactions.

As described in detail herein, the use of account adapters can enable asynchronous interaction with exchange computing systems such that errant responses are filtered or decoupled from an exchange management engine of the computing system, and handled by the computing system separately by the adapter. Valid responses from the exchanges can be processed by the adapter and published on an event feed, which can be monitored by the exchange management engine for more seamless facilitation and management of cross-medium transactions.

Furthermore, the cross-medium transaction management functions described herein can experience large "master" orders for a relatively large payment across value mediums (e.g., U.S. dollars to Euros). It is contemplated that such large "master" orders can expose the transaction management service certain risks, such as unfavorable exchange rates, market manipulation (e.g., front-running), and these client transactions consuming liquidity of other clients (e.g., drawing a disproportionate amount of digital currency from a client pool at a destination exchange). As a technical problem, this scenario can result in failed settlement of transactions at destination exchanges due to a depleted client pool resulting from servicing the master order. To address this technical problem, the exchange management engine described herein can establish a breakup threshold or a set of breakup thresholds that, in some aspects, can depend on the client pool balances of the destination exchanges. If a received transaction request or order includes an amount that exceeds the breakup threshold, the exchange management engine can break up the order into smaller sub-orders for treatment.

It is understood that such breaking up of large orders can add significant complexity, specifically when involving numerous large institutions making large, recurrent cross-medium transactions among many different value mediums (e.g., differing currencies), which involves several distinct destination exchanges. According to examples described herein, the transaction computing system can further include an order management engine that can organize, label, and manage broken up master orders in a records database or distributed ledger. In doing so, the order management engine can open a record for each sub-order of each master order, provide updates and/or reminders for unclosed sub-orders, and can ultimately reconcile each master order in its records (e.g., through monitoring of the event feed published by a corresponding adapter).

In certain scenarios, clients may seek to avoid the exposure to volatility inherent in transacting through exchanges. While limited in time compared to typical current foreign exchange transactions involving nostro/vostro accounts (which can last several days), transacting through exchanges requires clients to open accounts at the originating and destination exchanges, making them dependent on the quality of their orderbooks (which can impact exchange rates), exchange fees, limitations on trade volume, as well as any potential security limitations in the network infrastructure of the exchanges.

In such scenarios, the transaction computing system can provide digital client wallets holding a local pool of digital currency for each client, which can replace the on-demand liquidity provided by the exchanges. In variations, the clients can create local digital wallets of the digital currency within their own computer networks or through third-party cloud computing services. In variations, the computing system described herein can manage the digital wallets of the clients. In any case, the transaction computing system can provide exchange quotes to sending and receiving clients—for example, based on quote requests to the normal originating and destination exchanges, or by enabling sending and receiving clients to set the originating and destination exchange rates respectively—and facilitate the transaction by performing direct digital currency transfer between each client's digital wallet based on the provided exchange rate(s). The receiving client, having access to its own local wallet, may then disburse the received amount in the destination value medium or home currency.

Among other benefits, the examples described herein achieve various technical effects in order to provide technical solutions in the field of cross-medium transaction services. A root problem in such transactions involves a technical inability for traditional transacting institutions to transact with on-demand liquidity without the use of parked funds in nostro accounts. Accordingly, the standard practice of such institutions has been to tolerate a certain level of cost in opportunity resultant from maintaining such accounts with foreign institutions. The advent of decentralized distributed ledgers and digital currency technology opens the door to provide various technical solutions, as described herein, to this root problem in the field of cross-medium transaction services.

It is contemplated throughout the present application that various service fees between entities described herein may be calculated, presented, requested, and transferred at any step described herein. For the purpose of illustration, these service fee calculations, presentations, requests, and payments are largely disregarded to provide a comprehensive description of the technical features of the various concepts detailed herein.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, virtual reality (VR) or augmented reality (AR) computers, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the disclosure include processors and various forms of memory for holding data and instructions. Examples of non-transitory computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

On-Demand Liquidity Transaction Service

FIG. 1 is a block diagram illustrating an example transaction service 100 providing on-demand liquidity, according to examples described herein. The transaction service 100 can be facilitated by a transaction computing system 140 that comprises an exchange management engine 160 and messaging interface 145 for coordinating and executing commands between sending users 105, originating institutions 110, originating exchanges 130, destination exchanges 180, destination institutions 190, and/or receiving users 195. As provided herein, the sending users 105 and receiving users 195 can comprise clients of the transaction service 100, and can include individual users, businesses, households, charities, financial entities (e.g., local banks), and the like.

In various implementations, the originating institution 110 and the destination institution 190 can also comprise clients of the transaction service 100, and can include cross-medium or cross-border transaction entities, such as large financial institutions, multi-national corporate entities, governmental entities, non-governmental organizations, and the like. Accordingly, the originating institution 110 and destination institution 190 can also comprise sending clients and receiving clients, as discussed throughout. Furthermore, a sending client may refer to an originating institution 110, such as a bank, or can refer to any initiating transacting entity, such as a commercial business or individual user. Along these lines, a receiving client can refer to a destination institution 190, such as a bank, or any collecting entity, such as a commercial business or individual user.

In various examples, a sending user 105 can initiate a transaction session to transmit a cross-medium transaction request to the sending user's 105 originating institution 110 (e.g., the user's bank). The cross-medium transaction request can comprise a quote request that queries for an exchange rate between the user's value medium and a destination value medium. Using a secure messaging interface 145 operating under a secure and dedicated format or schema managed and/or authenticated by the transaction computing system 140, the originating institution 110 can transmit a quote request through the messaging interface 145 to the transaction computing system 140.

The messaging interface 145 can function to coordinate between the respective entities shown in FIG. 1 through one or more messaging networks 120 using the established format and/or schema developed for the transaction service 100. In certain implementations, the originating institution 110, the destination institution 190, the originating exchange 130, the destination exchange 180, the receiving users 195, and/or the sending users 105 can communicate directly with any one or more of the foregoing entities over the messaging network(s) 120 using the messaging format or schema devised by the transaction service 100. Additionally or alternatively, the coordination of any cross-medium transaction may be orchestrated by the transaction computing system 140 through transaction requests, quote acquisitions from exchanges 130, 180, trade commands to the exchanges 130, 180 and institutions 110, 190, status updates to and from the users 195, 105, and/or trade confirmations to each entity.

Upon receiving a transaction request, an exchange management engine 160 of the transaction computing system 140 can create a record of the upcoming transaction in a decentralized ledger 170 over one or more networks 165. The decentralized ledger 170 functions to guarantee security and accuracy of all transactions coordinated by the transaction computing system 140. Once transaction records are created on the decentralized ledger 170, they become immutable such that subsequent challenges to data recorded on the ledger 170 are not possible. These accuracy and security guarantees can function to replace many aspects of the bilateral agreements made between financial institutions, which are typically designed to have a series of assessments and authentication steps in place to provide the necessarily reliable recordkeeping for cross-medium transactions. As described herein, each node of the decentralized ledger 170 can update independently and further process each transaction coordinated by the transaction computing system 140. Thus, the decentralized ledger 170 in FIG. 1 is shown for illustrative purposes and is not limited to the configuration shown in FIG. 1.

In various implementations, the exchange management engine 160 of the transaction computing system 140 can process the transaction request to identify a receiving user 195 and/or a destination institution 190. In certain examples, the transaction request can further identify the originating exchange 130 at which the sending user 105 or the originating institution 110 has a digital wallet 132 storing a certain amount of a digital currency utilized by the transaction computing system 140 to facilitate cross-medium transactions. For example, if the sending user 105 is a multi-national business and operating in both the United States and Argentina, and wishes to pay an Argentinian contractor in Argentine pesos from U.S. dollars, the sending user 105 can transmit a transaction request via the messaging network 120 directly to the transaction computing system 140, or indirectly through an financial institution 110 (e.g., a U.S. bank) associated with the sending user 105. In certain implementations, the transaction request can include an identifier of the receiving user 195 (the Argentinian contractor) and/or the receiving institution 190 (e.g., an Argentinian bank of the receiving user 195). In further implementations, the transaction request can include a quote request for exchange rates.

According to examples described herein, the exchange management engine 160 can process the transaction request by determining an originating exchange 130 associated with the sending user 105 and a destination exchange 180 associated with the receiving user 195. The exchange management engine 160 may then transmit the quote request to the originating exchange 130 and the destination exchange 180. These exchanges 130, 180 can comprise third-party entities that function to facilitate the secure storage of digital currency in digital wallets 132, 182 for their own clients. In this example, the originating exchange 130 includes a digital wallet 132 storing a certain amount of the digital currency for the originating institution 110, and the destination exchange includes a digital wallet 182 storing a certain amount of the same digital currency for the destination institution 190.

Each exchange 130, 180 can process the quote request and return an exchange quote. This exchange quote can comprise the current exchange rate between the respective home medium and the digital currency for each exchange 130, 180. In the example above, the originating exchange 130 can provide a current exchange quote between U.S. dollars and the digital currency, and the destination exchange 180 can provide a current exchange quote between Argentinian pesos and the digital currency. In various examples, upon receiving the exchange quotes, the exchange management engine 160 can generate a guaranteed exchange quote between the originating medium (e.g., U.S. dollar) and the destination medium (e.g., Argentinian peso).

In certain aspects, the exchange management engine 160 can generate the guaranteed exchange rate between the two value mediums (e.g., U.S. dollars and Argentinian pesos) based solely on the two exchange quotes received from the exchanges 130, 180. In variations, the exchange management engine 160 can generate the guaranteed exchange rate between the two value mediums based on the two exchange quotes and projected or current volatility information of each value medium. This can include the projected or current volatility of the originating value medium, the digital currency, and/or the destination value medium.

Once the guaranteed exchange rate is provided to the sending client (the sending user 105 or originating institution 110), the sending client may either authorize the transaction in a specified transaction amount or reject the guaranteed exchange rate. If authorized, the exchange management engine 160 can generate transaction instructions for the originating institution 110, the originating exchange 130, the destination exchange 180, and the destination institution 190. In various implementations, the transaction instructions cause the originating exchange 130 to receive the transaction amount in the originating value medium. In the above example, the transaction instructions can cause the originating institution 110 to withdraw the transaction amount in U.S. dollars from the sending user 105, and transfer the transaction amount to the originating exchange 130.

The originating exchange 130 can convert the originating value medium to the digital currency. In variations, the originating institution 130 or sending user 105 may have a digital wallet 132 with a certain amount of the digital currency at the originating exchange 130. In any case, when the digital wallet 132 at the originating exchange 130 includes an amount of digital currency corresponding to the transaction amount, the transaction instructions can cause the originating exchange 130 to transfer the specified amount of the digital currency to the destination exchange 180. For example, the transaction instructions can identify the digital wallet 132 of the sending client and the digital wallet 182 of the receiving client to facilitate the digital currency transfer and subsequent conversion.

At the destination exchange 180, the transaction instructions can comprise a set of commands that ultimately result in a correct amount of digital currency being converted to the destination value medium, and subsequently deposited into an account of the receiving user 195 at the destination institution 190. In certain scenarios, the received amount of the digital currency at the destination exchange 180 will not equate to an amount corresponding to the guaranteed exchange rate provided by the exchange management engine 160. For example, as described herein, the lapsed time between receiving the exchange quotes and the conversion of the digital currency at the destination exchange 180 to the destination value medium exposes the transaction to a small amount of volatility, which can cause a slight deviation between the guaranteed exchange rate and the final exchange rate.

When nostro accounts are used, the exposure to this volatility may be several days until the transaction is finally settled. Thus, cross-medium transactions involving nostro accounts typically do not involve guaranteed rates, and if they do, one party must typically consume a loss due to volatility, or a subsequent transaction may be necessary to settle a net loss or gain based on an accumulation of transactions. According to examples described herein, the transaction computing system 140 can maintain a client digital currency pool 135, 185 at each exchange 130, 180 (e.g., every exchange enabling trading of the digital currency used herein). In certain implementations, this client digital currency pool 135, 185 can be used to fund the volatility difference between the guaranteed exchange rate and the final exchange rate at the destination exchange 180.

As implemented, the exchange management engine 160 can receive a set of status updates or confirmations that the asset conversions and transfers have taken place. At the destination exchange 180, before or after the conversion, a status update may be transmitted to the exchange management engine 160 indicating the amount received and/or converted. The exchange management engine 160 can determine a difference between the actual amount and a guaranteed amount corresponding to the guaranteed exchange rate.

If the received amount exceeds the guaranteed amount, the exchange management engine 160 can transmit a transfer message to the destination exchange 180 to transfer the positive difference from the digital wallet 182 of the destination institution 190 to the client digital currency pool 185, and settle the transaction thereafter. However, if the received amount is below the guaranteed amount, then the exchange management engine 160 can transmit an instruction to transfer the negative difference from the client digital currency pool 185 to the digital wallet 182 of the destination institution 190, and settle the transaction thereafter.

In variations, the transaction computing system 140 can pre-fund the digital wallets 132, 182 of the originating institution 110 and/or destination institution 190 with a slippage amount of the digital currency to be used solely for the slight volatility differences that occur due the elapsed time between providing exchange quotes and the final conversion at the destination exchange 180. In such an example, the private keys associated with each digital wallet 132, 182, and the client pools 135, 185 may not require access between entities. In this variation, the transaction computing system 140 can occasionally receive a current balance of the slippage of the sending and receiving clients. If the slippage amount is below a customized threshold for the client, the transaction computing system 140 can top up the slippage amount above the threshold by a predetermined amount. The customized threshold for each client may be based upon that client's utilization of the transaction service 100 and the value amounts in which the client transacts on a periodic basis (e.g., every two weeks), in order to prevent the slippage balance dropping to zero. In further variations, the transaction computing system 140 can still maintain a client pool 135, 185 of digital currency at each exchange 130, 180 as a final layer to be used only if slippage balances are depleted.

Once the correct amount of the digital currency is converted at the destination exchange 180 and transferred to the destination institution 190 in the destination value medium (e.g., Argentinian pesos), the destination exchange 180 and/or the destination institution 190 can transmit a status confirmation back to the exchange management engine 160 indicating that the transaction has been settled. The exchange management engine 160 may then record the transaction settlement as a hash in the transaction record (e.g., to the decentralized ledger 170 over the one or more networks 165), and transmit final confirmations to the sending client and the receiving client.

Accordingly, the nostro accounts of the institutions 110, 190 may be eliminated and the balances therein may be deployed by the institutions 110, 190 as they please. It is contemplated that the use of slippage balances and/or client pools 135, 185 at exchanges 130, 180 enable the transaction computing system 140 to provide guaranteed exchange rates to client, while the use of a decentralized ledger 170 for recordkeeping provides the clients with the necessary security and accuracy such that complex bilateral agreements between large institutions may be simplified.

On-Demand Liquidity Transaction Service Flow

Figure 2:
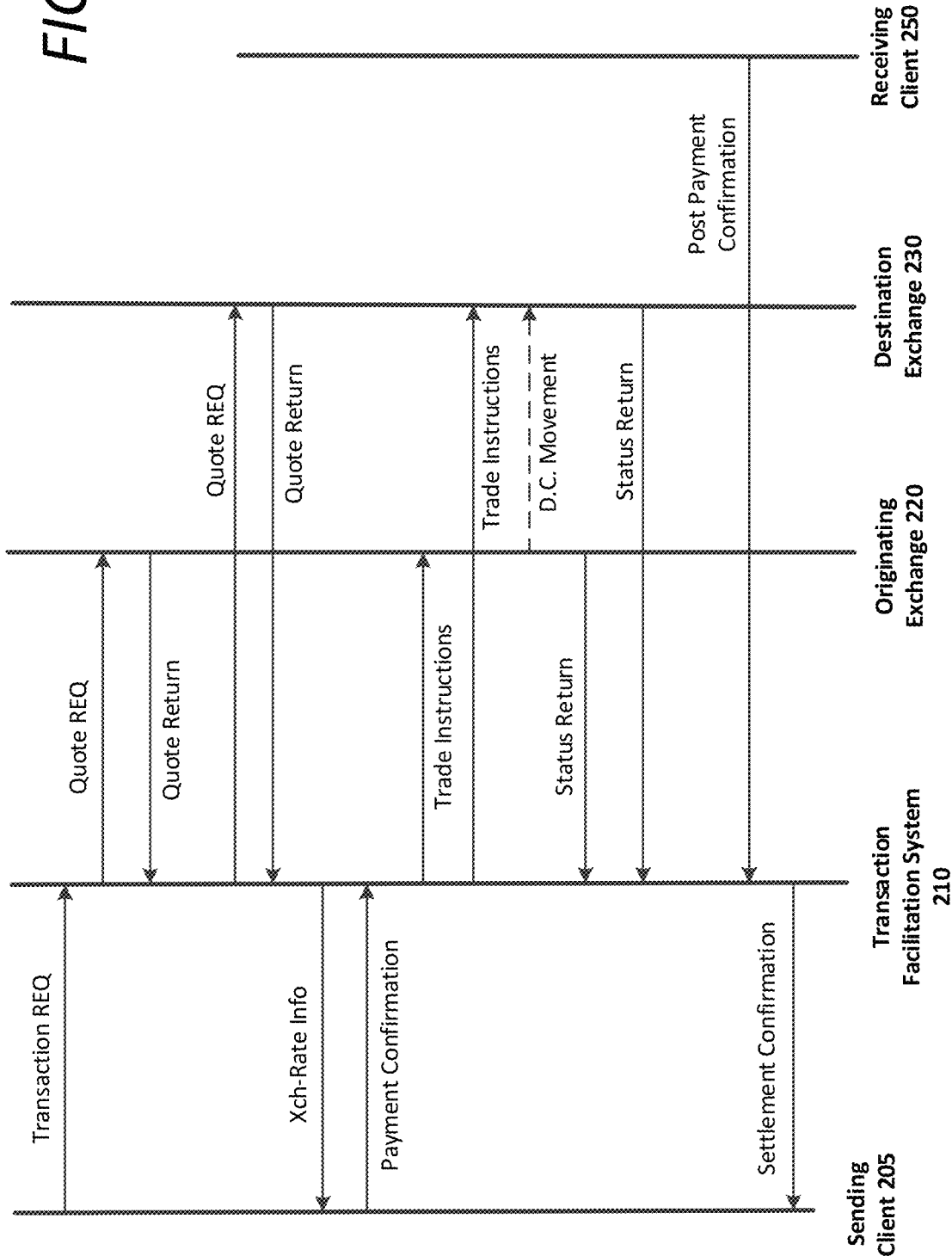
FIG. 2 is a service flow diagram illustrating an example transaction service flow for a transaction involving on-demand liquidity, according to examples described herein.

FIG. 2 is a service flow diagram illustrating an example transaction service flow 200 for a transaction involving on-demand liquidity, according to examples described herein. In the below description of FIG. 2, reference may be made to various features as shown and described with respect to FIG. 1. For example, the transaction facilitation system 210 can correspond to the transaction computing system 140 as shown in FIG. 1. Referring to FIG. 2, the transaction flow 200 can may begin with an initial transaction request being transmitted from a sending client 205 to the transaction system 210. In certain examples, the transaction request can identify an originating value medium and a destination value medium. In further examples, the transaction request can enable the transaction facilitation system 210 to identify an originating institution, a recipient client 250 (e.g., a bank, person, company, etc.), account identifier(s), wallet identifier(s), an originating exchange 220, and/or a destination exchange 230.

In certain implementations, the transaction facilitation system 210 can have access to certain account and/or wallet information to determine balances and to make an initial determination of whether the transaction is possible based on those balances. Upon receiving the transaction request from the sending client 205, the transaction facilitation system 210 can transmit a quote request to an originating exchange 220 corresponding to the sending client 205, and receive a return quote indicating the exchange rate at the originating exchange 220. As described herein, the return quote can indicate the exchange rate between the digital currency utilized by the transaction service and the originating value medium (e.g., a home fiat currency of the sending client 205).

The transaction facilitation system 210 can further transmit the quote request to a destination exchange 230 associated with the receiving client 250, and receive a return quote accordingly. The return quote from the destination exchange 230 can indicate an exchange rate between the digital currency and the destination value medium (e.g., a home fiat currency of the receiving client 250). Based on the return quotes from the originating exchange 220 and the destination exchange 230, the transaction system 210 can generate exchange rate information for the sending client 205. This exchange rate information can comprise a guaranteed exchange rate determined by the transaction system 210 for facilitating the cross-medium transaction. In some aspects, the guaranteed exchange rate must be accepted within a certain timeframe (e.g., ten minutes) to maintain the guarantee. At the end of this timeframe (e.g., as determined by a timer associated with the exchange rate information), the guaranteed rate can expire and the transaction service flow 200 would reset.

Upon receiving the exchange rate information, the sending client 205 can transmit a payment confirmation message to the transaction facilitation system 210. The transaction system 210 can process the payment confirmation message by generating a set of customized trade instructions for the originating exchange 220 and the destination exchange 230 to execute the transaction. The transaction system 210 may then transmit the trade instructions to the originating exchange 220 and the destination exchange 230 respectively, causing the movement of digital currency—in an amount corresponding to the transaction amount—from the originating exchange 220 to the destination exchange 230.

In certain implementations, the trade instructions transmitted to the destination exchange 230 can include a slippage instruction to withdraw or deposit a certain amount of digital currency from a slippage pool (e.g., client pool 185 in FIG. 1) of digital currency at the destination exchange 230 for conversion. This "slippage amount" can ensure that the converted amount equates to the guaranteed amount corresponding to the guaranteed exchange rate provided prior to the transaction. For example, it is contemplated that on occasion a received amount at the destination exchange 230 from the originating exchange 220 will not equate to the guaranteed amount that corresponds to the guaranteed exchange rate information provided to the sending client 205 due to, for example, volatility exposure of the transaction. In such a scenario, the transaction system 210 or the destination exchange 230 can perform a computation to determine a value difference, and cause a slippage amount equating to the value difference to be deposited to or withdrawn from the client pool 185 residing at the exchange 230, a slippage balance of the receiving client's 250 digital wallet 182, or a general client pool 185 of digital currency held at the destination exchange 230.

In response to successful execution of the transfer, the originating exchange 220 and the destination exchange 230 can transmit back status updates indicating the successful transfer. In further executing the trade instructions, the destination exchange 230 can convert an equivalent transaction amount of the digital currency to the destination value medium, plus or minus a volatility amount, as described above. That is, the destination exchange 230 can deposit or withdraw the volatility amount (e.g., a difference between a guaranteed amount and the converted amount) to or from a client pool 185 or slippage balance of the receiving client's 250 digital wallet 182, whichever the case may be.

The payment to the receiving client 250 can correspond to a conversion of the correct amount of the digital currency in the destination value medium (e.g., the home currency of the receiving client 250). This conversion and subsequent transfer to the receiving client 250 may be performed automatically by the destination exchange 230 based on the trade instructions initially transmitted by the transaction system 210. As such, the trade instructions may include account or wallet information identifying a financial account of the receiving client 250 (e.g., a bank account). Once the transaction amount has been received by the receiving client 250, a post-payment confirmation can be transmitted to the transaction system 210, indicating that the transaction has be finalized. In various examples, the transaction system 210 can transmit a settlement confirmation message to the sending client 205 and conclude the transaction.

System Description

Figure 3:
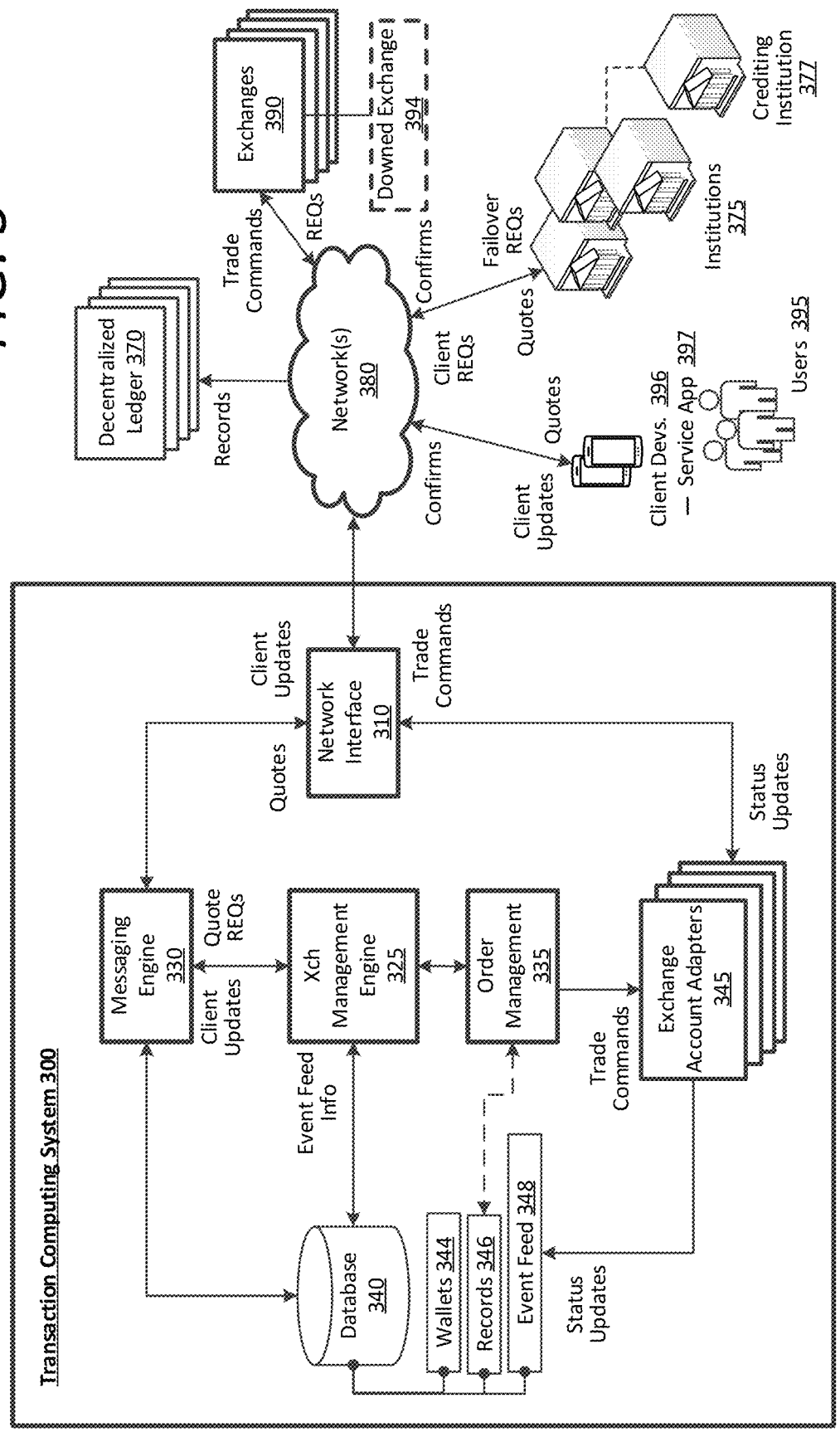
FIG. 3 is a block diagram illustrating a transaction computing system implementing on-demand liquidity for cross-medium transactions, according to examples described herein.

FIG. 3 is a block diagram illustrating a transaction computing system 300 implementing on-demand liquidity for cross-medium transactions, according to examples described herein. The transaction computing system 300 shown in FIG. 3 can correspond to the transaction facilitation system 210 and the transaction computing system 140 shown and described with respect to FIGS. 1 and 2 respectively. Accordingly, the functions of the transaction systems 140, 210 described with respect to FIGS. 1 and 2 may be performed by the logical blocks of the transaction computing system 300 as shown and described with respect to FIG. 3. Referring to FIG. 3, the transaction computing system 300 can include a network interface 310 (e.g., an application programming interface) to communicate over one or more networks 380 with client devices 396 of users 395, institutions 375 (e.g., financial institutions), and exchanges 390.

In certain examples, the network interface 310 can further enable the transaction computing system 300 to publish transaction records to a decentralized ledger 370, as described above. In various examples, each transaction record can comprise the details of each open and settled transaction, such as a transaction identifier, any status updates, transfer, conversion, and payment confirmations, timestamps and the like. As described above, each node of the decentralized ledger 370 can update independently and further process each transaction coordinated by the transaction computing system 300. Thus, the decentralized ledger 370 in FIG. 3 is shown for illustrative purposes, and is not limited to the configuration shown in FIG. 3.

In various implementations, the transaction computing system 300 can include an exchange management engine 325 that functions to coordinate each cross-medium transaction between sending clients and receiving clients (e.g., users 395 and/or institutions 375). As such, the exchange management engine 325 can manage the execution of orders and transfers (e.g., in digital currency, fiat currency, commodities, and other assets). Furthermore, in doing so, the exchange management engine 325 can comprise a payment orchestration layer, which may rely on synchronous interactions with the exchanges 390 to execute trades, determine order statuses, execute withdrawals, confirm deposits, and any other interaction that makes up a cross-medium transaction. However, it is contemplated that utilizing synchronous interactions with exchanges can cause transactions to fail (e.g., due to errant responses from the exchanges 390).

According to examples provided herein, the exchange management engine 325 can utilize a messaging engine 330 to communicate with the exchanges 390 via the network interface 310. As described herein, the messaging engine 330 can operate in accordance with a secure format or schema developed solely for the on-demand liquidity transaction service implemented by the transaction computing system 300. For synchronous interactions, the messaging engine 330 can perform polling tasks to confirm orders (e.g., one poll per order). When an overload of orders exists at an exchange 390, nonce collisions and potential throttling may result at the exchange 390, which can cause transaction failures.

To address this technical problem, the transaction computing system 300 can perform asynchronous interactions with each exchange 390. Specifically, the transaction computing system 300 can include an exchange account adapter 345 for each account of each exchange 390, which can decouple polling from orders. Accordingly, polling is performed as a separate task, so that errant responses from the exchanges 390 will no longer require special handling or result in a failed transaction.

Specifically, each exchange account adapter 345 can comprise an integration point with a given exchange 390 for a given account. In various examples, there can be one exchange account adapter 345 per account per exchange operating at any time. Each exchange account adapter 345 can accept trade commands from the exchange management engine 325 and asynchronously publish or output events, for example, to an event feed 348 in a local database 340 of the transaction computing system 300. In certain examples, the exchange account adapter 345 can output an account exchange connection status event that comprises, for example, an exchange account address and account balance events indicating transfers, withdrawals, deposits, and/or value medium conversions. When operating, the exchange account adapter 345 can receive commands from the exchange management engine 325 to execute trades and transfers, which the adapter 345 can route to a corresponding exchange 390. The exchange account adapter 345 can then asynchronously publish events to an event feed 348 of any and/or all orders, trades, and transfers for a corresponding account of the exchange 390. In various examples, the exchange account adapters 345 can be framework-independent and therefore can be reused with any number of distributed execution frameworks.

The exchange management engine 325 may then reconcile the event feed 348—indicating trade and transfer information as published by the exchange account adapter 345 of a specified exchange 390—with its own internal orders and transfer records 346. Accordingly, each exchange account adapter 345 can generate a comprehensive event feed 348 consisting of order, trade, and transfer data from a corresponding exchange 390. Using the framework described herein, the transaction computing system 300 can utilize the exchange account adapters 345 to increase throughput capability with the exchanges 390, increase resilience to exchange failure, and increase capability to modulate order types to the exchanges 390.

In large-scale transaction management, further problems may occur due to increasing transaction volume, which may be treated through single market orders for large value payments. However, this can expose the transaction computing system 300 to unfavorable rates, market manipulation via the exchanges 390 (e.g., front-running), and different client transactions consuming the liquidity of other clients. According to examples described herein, the exchange management system 325 can solve these problems by breaking up these large orders into smaller orders, and distribute and randomize these smaller orders over a period of time. Specifically, the transaction computing system 300 can include an order management module 335 that strategically breaks up incoming "master" orders into a set of sub-orders based on a ruleset.

The order management module 335 can track all in-flight trades and transfers across all clients in the records database 346 and/or the decentralized ledger 370. The order management module 335 can enable the exchange management engine 325 to leverage limit orders with the exchanges 390 to reduce risk, and reserve market orders for topping up balances in the client pools or slippage balances. Furthermore, by organizing broken up orders, the exchange management engine 325 can perform order queuing techniques. Specifically, in the event of a disabled market or exchange 390, the order management module 335 can queue orders in the records database 346, and then release the orders once the market or exchange 390 is reenabled.

In an example scenario, the exchange management engine 325 can receive a large transaction request from an institution 375 that has an account with a particular exchange 390. The transaction amount corresponding to the request can comprise a "master" order when the amount exceeds a particular threshold, or a tiered threshold of a multi-tiered order management scheme. The order management module 335 can determine the manner in which to break up the request into sub-orders. For example, the order management module 335 can divide the transaction amount into equal amounts as sub-orders, input a tag to each sub-order, and record each of the sub-orders in the records database 346 for subsequent tracking.

In the event of a downed exchange 394 (e.g., due to scheduled maintenance), the order management module 335 can put a hold on the sub-orders, and queue them in the records database 346 until the downed exchange 394 comes back online. Thereafter, the exchange management engine 325 can release the sub-orders to the specified exchange 390 for execution and receive status updates (e.g., via the event feed 348 as published by the exchange account adapter 345 corresponding to the specified exchange 390). The order management module 335 can then reconcile each sub-order for each master order in the records database 346. Once each sub-order is reconciled, the order management module 335 can close the transaction record for the master order.

In various examples, the transaction computing system 300 relies on the infrastructure of the exchanges 390 in order to complete transactions. If a particular destination exchange 394 is down, the exchange management engine 325 will be unable to complete a transaction. In such a scenario, the exchange management engine 325 can utilize a third-party crediting institution 377 (e.g., a financial institution) distinct from the downed exchange 394 to execute the transaction on credit with the third-party institution 377.

In various implementations, the transaction computing system 300 can identify when a particular exchange 394 is down since transaction quotes, trade instruction messages, digital currency movement to and/or from the downed exchange 394, and payments to the downed exchange 394 may fail. In some aspects, the downed exchange 394 may perform planned network downtime (e.g., for maintenance) and provide the transaction computing system 300 with a timetable for the planned downtime. In such scenarios, any end-to-end transaction involving the downed exchange 394 will likely fail. Furthermore, during the downtime, clients such as users 395 and other institutions 375 will be unable to receive accurate transaction information, such as exchange quotes, and will be unable to initiate a transaction since funds cannot reach the downed exchange 394.

As an alternative to queuing the orders in the records database 346, the transaction computing system 300 can bypass the downed exchange 394 to provide quotes to clients, initiate transactions for the clients, and return transaction statuses to the clients when transactions are executed. The transaction computing system 300 can perform such tasks by leveraging the messaging engine 330 to maintain communications with the other exchange 390 (e.g., a functioning counterpart originating exchange), and performing or settling the transaction on-credit. Specifically, the transaction computing system 300 can form partnerships with certain crediting institutions 377 in the same marketplaces as the exchanges 390. Upon identifying that a particular exchange 394 is down, the exchange management engine 325 can trigger the messaging engine 330 to open communications with a corresponding crediting institution 377 that services the same or a similar service sector or area (e.g., a geographic area) as the downed exchange 394.

Accordingly, clients (e.g., users 395 or institutions 375) seeking to make a transaction via a downed exchange 394 can transmit a quote request using a client device 396 (e.g., via the executing service application 397), which can be processed by the messaging engine 330 and forwarded to the exchange management engine 325. In certain examples, the exchange management engine 325 can submit the quote request to the downed exchange 394, which would yield a failed return message. In variations, the exchange management engine 325 can identify the downed exchange 394 from the transaction request and perform a lookup in the event feed 348 to identify that the exchange account adapter 345 corresponding to the downed exchange 394 has flagged the exchange 394 as being down (e.g., based on a certain number of failed return messages from that exchange 394).

Knowledge of the downed exchange 394 can trigger a failover to the crediting institution 377 for the requested transaction by the user 395. In this failover state, the exchange management engine 325 can transmit the quote request to a counterpart exchange 390 (e.g., the functioning exchange of the originating exchange or the destination exchange) and receive an exchange quote in return. The exchange management engine 325 can then transmit an on-credit transaction request to the crediting institution 377 as opposed to the downed exchange 394. With knowledge that the transaction will occur external to the exchanges 390, the crediting institution 377 can process the on-credit transaction request and make the final payment corresponding to the user's transaction to the receiving client, and transmit a status update indicating that the transaction was executed. Upon receiving this status update, the exchange management engine 325 can transmit a confirmation message to the client device 396 of the sending user 395.

In the event that the downed exchange 394 is an originating exchange (e.g., one that converts between U.S. dollars and the digital currency), the exchange management engine 325 can be triggered to perform the on-credit transaction with the crediting institution 377 associated with the destination marketplace (e.g., a destination exchange that converts between the digital currency and British Pounds). In the event that the downed exchange 394 is a destination exchange, the exchange management engine 325 can still perform the on-credit transaction request with the crediting institution 377 of the destination marketplace. Accordingly, if either the originating or the destination exchange is down—which breaks the transaction flow of the digital currency between the originating exchange and the destination exchange—the exchange management engine 325 will execute the on-credit transaction request with a crediting institution 377 of the destination.

However, depending upon which exchange 394 is down, the exchange management engine 325 can perform differently in executing the final settlement or reconciliation of the credited amount. If the downed exchange 394 is an originating exchange, then the exchange management engine 325 can provide the quote from the destination exchange 390. If accepted, the exchange management engine 325 can place a hold request on the transacting amount in, for example, a transaction backlog of the downed originating exchange 394. The hold request can indicate the transaction amount, a sending user ID, destination exchange ID, and a receiving user ID. In such an example, the transaction amount from the sending user 395 will automatically convert to the digital currency at the originating exchange when it becomes operational, and then transfer the digital currency to the destination exchange 390 for conversion to the destination medium (e.g., a particular currency).

On the destination end, the exchange management engine 325 can transmit a credit notification indicating the on-credit transaction to the destination exchange 390. This credit notification can identify the sending user, the receiving user, originating exchange ID, and the transaction amount. Accordingly, when the originating exchange 394 comes back online, the destination exchange 390 will receive an amount of the digital currency corresponding to the on-credit transaction (e.g., plus or minus a volatility amount during the downtime). The destination exchange 390 can transmit a confirmation message indicating the received amount of the digital currency to the exchange management engine 325—or the exchange account adapter 345 corresponding to the destination exchange 390, which can then publish the update to the event feed 348 monitored by the exchange management engine 325.

In real-time or periodically (e.g., once per day), the exchange management engine 325 can coordinate with the destination exchange 390 and crediting institution 377 to reconcile the credited amount corresponding to the transaction. It is contemplated that this amount may be different than the received amount by the destination exchange, minus fees and/or interest. If the final amount is higher than the received amount (e.g., the difference being the volatility amount minus fees and/or interest), the exchange management engine 325 can transmit an instruction to the destination exchange 390 to add the surplus volatility amount less fees and/or interest into the customer pool held by the destination exchange 390, and to convert the remainder to the destination medium. This destination medium amount may then by transferred to the crediting institution 377 to reconcile the on-credit transaction.

If the downed exchange 394 is a destination exchange, then the exchange management engine 325 can provide the exchange quote from the originating exchange 390 to the sending user 395. If accepted, the exchange management engine 325 transmit transaction instructions to the originating exchange 390 to hold the transaction amount or convert the transaction amount to the digital currency and hold the digital currency amount. The exchange management engine 325 may then transmit a credit transaction instruction to the crediting institution 377 corresponding to the downed destination exchange 394 to execute an on-credit payment, according to the transaction amount, to the receiving user 395.

The held amount, whether in the originating medium or converted to digital currency, can be placed in a holding queue at the originating exchange 390 until the destination exchange 394 comes back online. The exchange management engine 325 can identify the destination exchange 394 coming back online through a status update transmitted via the messaging engine 330, or via the event feed 348 when updated by the exchange account adapter 345 corresponding to the destination exchange 394. Once detected, the exchange management engine 325 can transmit a release message to the originating exchange 390, which can transmit the transaction amount in digital currency to the destination exchange 394, which can transmit a status update indicating the transferred amount to the messaging engine 330, or the corresponding exchange account adapter 345 for publication in the event feed 348.

The exchange management engine 325 can compare the on-credit transaction amount to the transferred amount from the originating exchange 390. For example, with knowledge of the on-credit transaction amount, the exchange management engine 325 can transmit a settlement instruction to the destination exchange 394 to withdraw or deposit a difference amount to or from the customer pool of digital currency at the exchange 394, and settle the relevant amount in the destination medium to the crediting institution 377.

Numerous variations of settling with the crediting institution 377 are also contemplated. For example, the transaction service implemented by the transaction computing system 300 can comprise a funding account at the crediting institution 377, which can be utilized by the exchange management engine 325 to settle funds with the receiving client or to settle an on-credit transaction by the crediting institution 377. In one example, the order management engine 335 can track the transaction flows of all on-credit transactions in its internal records 346 and/or as published on the decentralized ledger 370. At a settlement interval (e.g., once a week), the exchange management engine 325 can settle the final on-credit transaction amounts at each crediting institution 377 holding a credit balance.

In further variations, the sending client (e.g., user 395 or sending institution 375) can have a nostro account at the crediting institution 377. In this case, no exchanges are needed, and the transaction can be performed directly. In still further variations, the transaction service implemented by the transaction computing system 300 and the crediting institution 377 may both have access to a digital wallet at the destination exchange 390 corresponding to the crediting institution 377. In this scenario, the exchange management engine 325 can transmit a transfer instruction to cause a wallet to wallet transfer of the on-credit transaction amount in an equivalent amount in the digital currency.

It is contemplated that certain clients of the transaction service implemented by the transaction computing system 300 may have the capacity to bypass the exchanges 390 outright, which may serve to speed up cross-medium transactions and reduce volatility exposure. Specifically, in order to execute transaction through the exchanges 390, each client must open an account with an exchange 390. Currently, many exchanges 390 primarily facilitate crypto-traders and speculators, and some exchanges 390 have unreliable and/or expensive fiat deposit methods. Furthermore, the quality of exchange order books can impact the provided exchange rates to sending clients, and certain exchanges 390 may not have the capacity to scale up their operations to handle some of the large cross-medium transactions required by large corporate entities. Still further, as described herein, certain exchanges 390 cannot guarantee availability to facilitate transactions at all times (e.g., due to downtime maintenance or upgrades).

According to examples described herein, the transaction computing system 300 can replace the on-demand liquidity provided by the exchanges 390 with wallets 344 that contain a certain amount of the digital currency for sending and receiving clients. In such examples, the clients of the transaction service can pre-fund a "hot wallet" 344 with digital currency for cross-medium transactions. To execute a transaction, a sending client can transmit a message establishing an exchange rate for the originating medium and digital currency, and the receiving client can transmit a message establishing an exchange rate for the digital currency and destination medium. Upon receiving the messages, the exchange management engine 325 can generate a payment execution quote based on the quotes provided by the sending and receiving clients.

According to various examples, the payment execution quote can comprise a send amount in the originating value medium, a receipt amount in the destination value medium, any transaction fees in each respective medium, and a corresponding digital currency amount to bridge between the two value mediums based on the generated exchange rate(s). The exchange management engine 325 may then transmit the payment execution quote to both the sending and receiving clients, which can be accepted or rejected. When both clients accept the quote, the exchange management engine 325 can access the hot wallet 344 of sending client and transfer the digital currency amount from the hot wallet 344 of the sending client to a hot wallet of the receiving client. The receiving client may then request conversion of the digital currency amount to the receiving value medium. Upon receiving a confirmation message from the receiving client that the digital currency was converted and deposited, the order management module 335 can record the details of the transactions accordingly.

In various implementations, the sending client and the receiving client can each manage a respective wallet of cryptocurrency independently (e.g., external to the exchanges 390 and/or directly on the ledger 370). In such examples, the exchanges 390 local to each client can enable the clients to configure risk tolerance (e.g., the value amount and time of exposure to cryptocurrency volatility) by acting as treasury management entities that readily facilitate cryptocurrency to local value-medium conversions and vice versa. Along these lines, each client can also utilize the exchanges 390 for cash and liquidity management (e.g., for on-demand foreign exchange), which enables each client to self-manage liquidity risk, market risk, and/or credit risk.

In such examples, the transaction computing system 300 can comprise a facilitator for direct wallet-to-wallet exchanges from a sending client to a receiving client, as described above. In certain examples, the transaction computing system 300 can determine the exchange rates between value mediums in any number of ways. These exchange rates can correspond to rates between the originating and destination value mediums themselves (e.g., the respective currencies) as well as the rates between the cryptocurrency and each value medium. In one example, the transaction computing system 300 queries what would otherwise be an originating exchange and a destination exchange for the respective exchange rate quotes between the originating value medium and cryptocurrency and the destination value medium and the cryptocurrency.

In variations, the sending client and receiving client can establish exchange rates between the cryptocurrency and respective local value medium, which the transaction computing system 300 can utilize to generate the quotes for each client. In further variations, the quotes can be based on current exchange rate data from any number of third-party foreign entities, or the general marketplace (e.g., a foreign exchange marketplace that establishes exchange rates based on supply and demand between currencies). Upon generating the quotes for the sending and receiving clients, the transaction computing system 300 can facilitate the transfer by, for example, bypassing the originating exchange 220 and destination exchange 230 and communicating directly with the sending client 205 and receiving client 250 using the dedicating messaging protocol of the transaction service, as shown in FIG. 2.

Specifically, the transaction computing system 300 can generate exchange rate quotes in the manner(s) discussed herein and coordinate the transaction between sending and receiving clients by transmitting trade instructions and confirmations directly. The transaction service flow can comprise receiving confirmations of the exchange rate quotes from both the sending and receiving clients, a secure message to the sending client to transmit a specific amount of cryptocurrency to the wallet of the receiving client, and a confirmation to each client that the transaction is complete. Additionally, a record of the transaction can be published to the decentralized ledger 370 as a confirmation that the transaction has completed. In various examples, the receiving client can perform the conversion between the received cryptocurrency via a local exchange. For example, the receiving client can make conversions based on cryptocurrency or home currency volatility and risk appetite.

Client Computing Devices

Figure 4A:
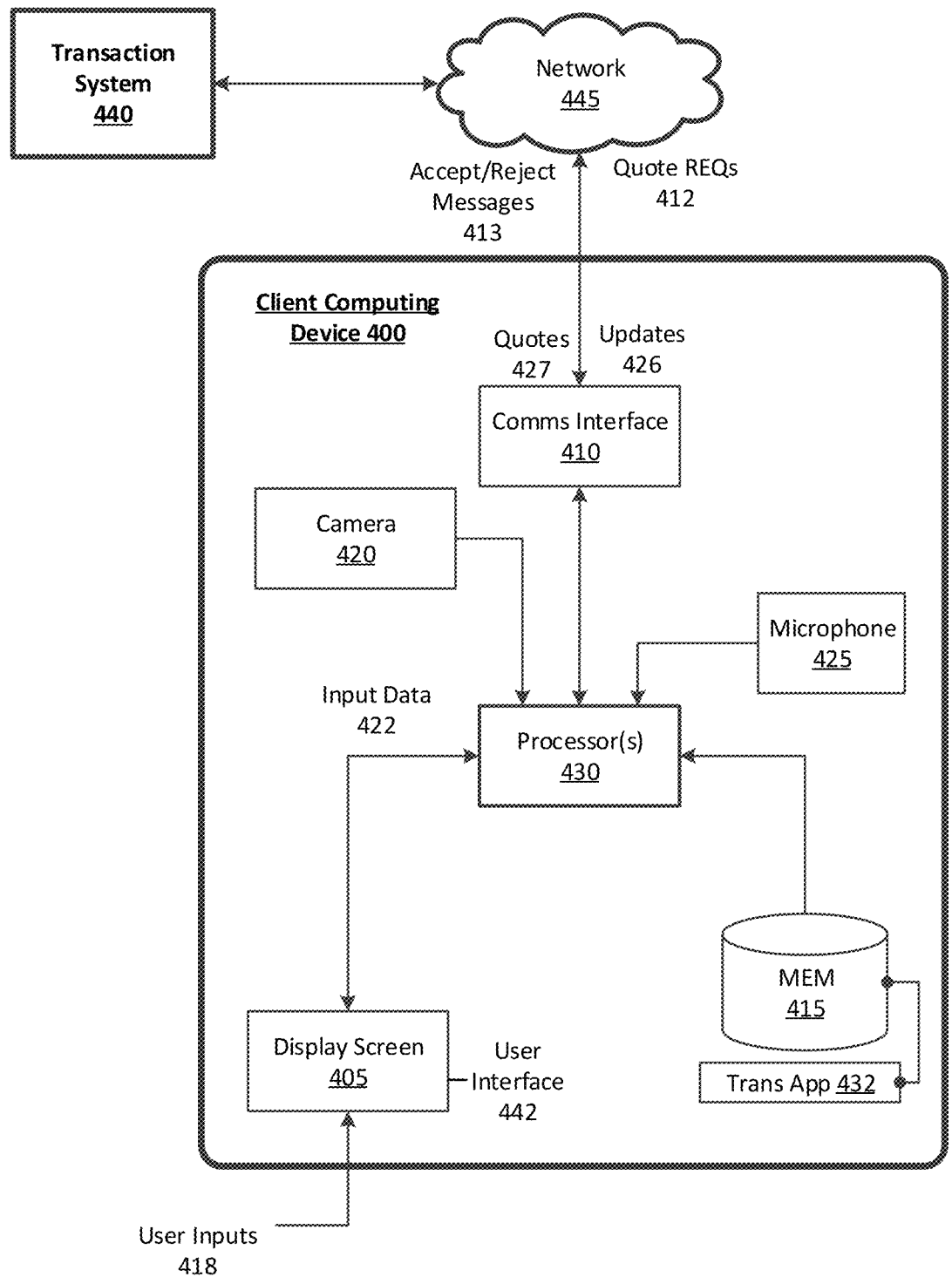
FIG. 4A is client computing device executing a transaction application for initiating on-demand transaction services, as described herein.

FIG. 4A is a block diagram illustrating an example computing device utilized by clients of the on-demand liquidity transaction service, according to various examples. In many implementations, the computing device 400 can comprise a mobile computing device, such as a smartphone, tablet computer, laptop computer, VR or AR headset device, and the like. In variations, the computing device 400 can comprise a desktop personal computer typical of the office spaces of business entities. In some examples, the computing device 400 can include certain features such as a microphone 425, a camera 420, and/or a communication interface 410 to communicate with external entities using any type of wireless or wired communication protocol. In certain aspects, the computing device 400 can store a designated application (e.g., a transaction service application 432) in a local memory 415.

In response to a user input 418 selecting the transaction service application 432, the application 432 can be executed by one or more processors 430, which can cause a user interface 442 to be generated on a display screen 420 of the computing device 400. Furthermore, the executing application can enable the computing device 400 to communicate with the transaction system 440 over one or more networks 445. As provided herein, the transaction system 440 shown in FIG. 4A can correspond to the transaction computing system 140 of FIG. 1, the transaction facilitation system 210 of FIG. 2, and the transaction computing system 300 of FIG. 3.

The user interface 442 of the transaction service application 432 can enable the client to transmit quote requests 412, view return quotes 427, transmit accept or reject messages 413 based on the received quotes 427, initiate and execute cross-medium transactions, view transaction status updates 426, and the like. Transmission of a quote request 412 to the transaction system 440 over the network 445 can enable the transaction system 440 to acquire exchange quotes from the relevant exchanges and provide a transaction quote 427 to the computing device 400, which can be displayed on the user interface 442. The user interface 442 can enable the client to accept or reject the quote 427. As described above, acceptance of the quote 427 can cause the transaction system 440 to perform the transaction processes described herein, and provide status updates 426 until the cross-medium transaction is settled.

Figure 4B:
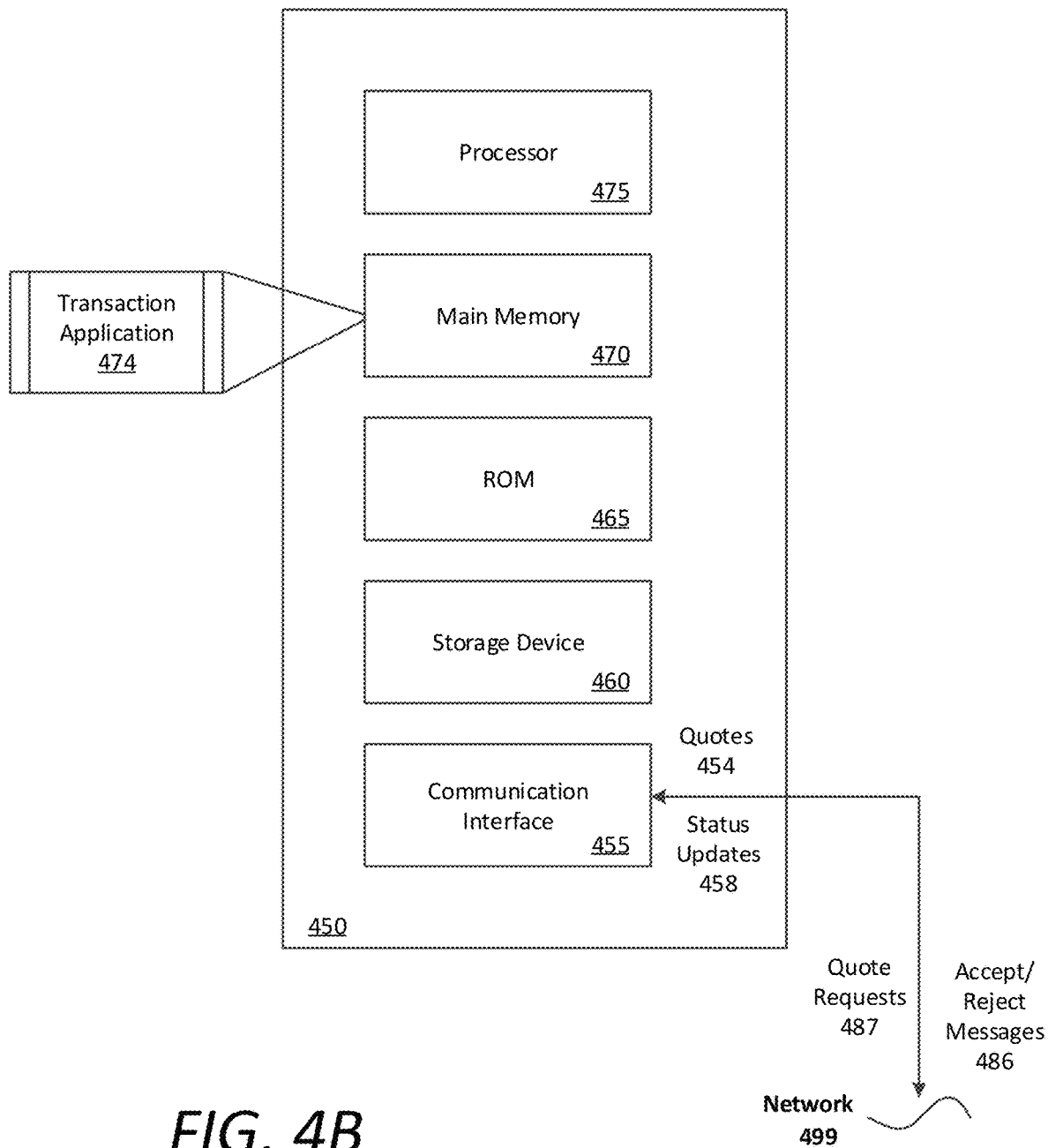
FIG. 4B is an example of a client computer system 450 from which clients may execute transactions as described herein.

FIG. 4B is an example of a client computer system 450 from which clients may execute transactions as described herein. The computer system 450 can be implemented on, for example, a server or combination of servers, and may function to enable a client to execute cross-medium transaction. The computer system 450 includes processing resources 475, a main memory 470, a read-only memory (ROM) 465, a storage device 460, and a communication interface 455. The computer system 450 includes at least one processor 475 that executes a transaction application 474 stored in the main memory 470 to facilitate sending and/or receiving clients to access the transaction services described throughout the present disclosure.

The communication interface 455 enables the computer system 450 to communicate over one or more networks 499 (e.g., cellular or Wi-Fi network) through use of the network link. Using the network link, the computer system 450 can communicate with one or more computing devices, one or more servers, and/or the transaction computing system described throughout (the transaction computing system 140 of FIG. 1, the transaction facilitation system 210 of FIG. 2, and the transaction computing system 300 of FIG. 3). The executable instructions in the memory 470 can include application-based instructions that the computer system 450 can execute to access and interact with the cross-medium transaction services implemented by the transaction computing system 300 of FIG. 3. In various examples, the computer system 450 described in connection with FIG. 4B may be utilized by institutional clients (e.g., domestic and international banks) to provide foreign exchange services to their respective clients using the transaction facilitation means described herein.

Methodology

In the below discussions of the various methods of FIGS. 5-8, reference may be made to reference characters representing certain logical blocks, engines, or modules described with respect to the systems diagrams of FIGS. 1-4. Furthermore, certain logical blocks shown in FIGS. 1-4 may be recited herein as computing engines or modules that can perform the functions of the processes shown and described with respect to the flow charts of FIGS. 5-8. For example, the transaction computing systems 140, 210, 300, and 490 shown in FIGS. 1-4 the various components described therein respectively, may perform the processes described in the flow charts of FIGS. 5-8. Further still, certain methods, steps, or processes described with respect to individual flow charts of FIGS. 5-8 may be combined with other steps or other flow charts, and need not be performed in the respective sequences shown.

Figure 5:
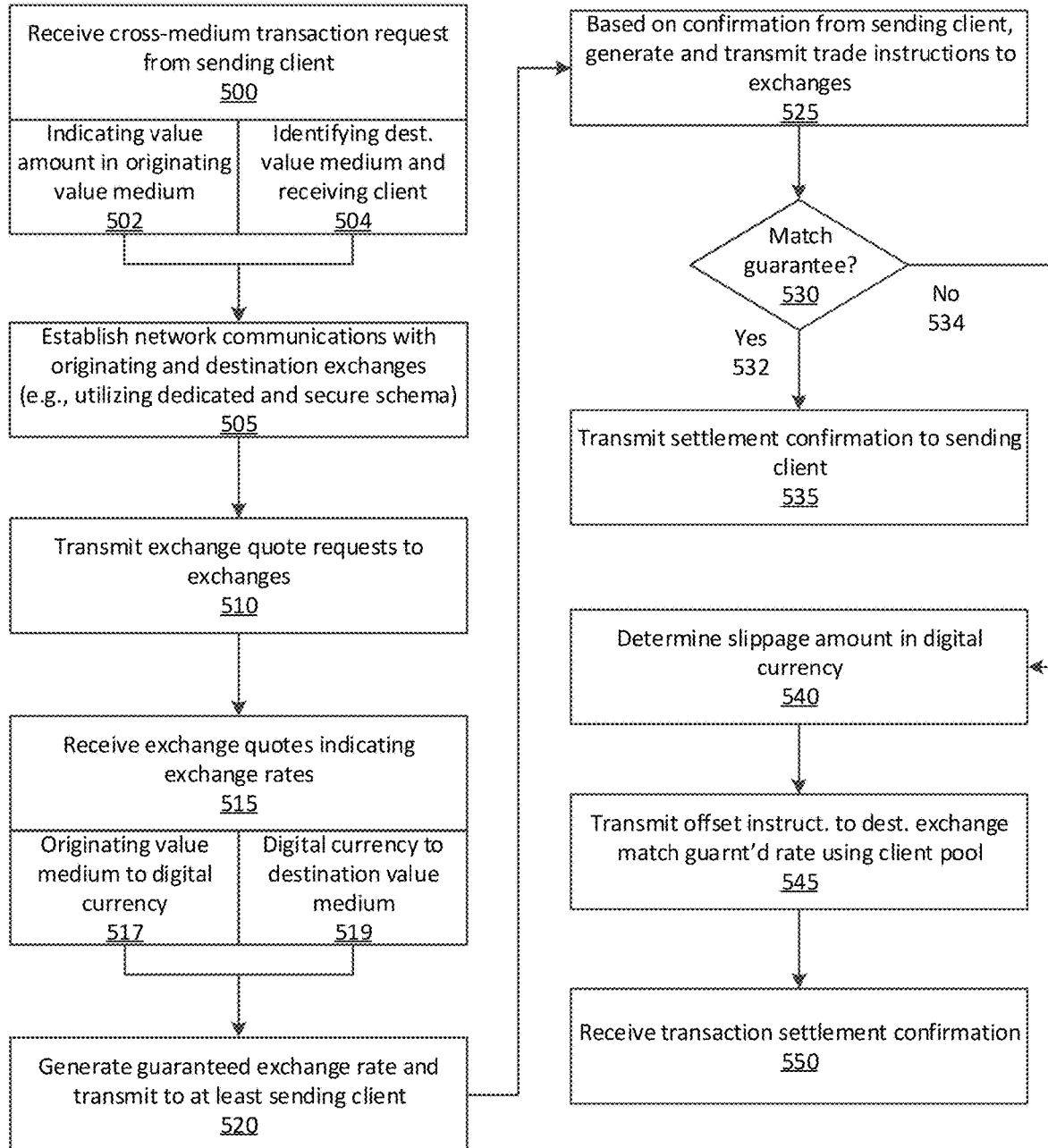
FIG. 5 is a flow chart describing example methods of facilitating cross-medium transactions using the on-demand liquidity and volatility resolution techniques described herein.

FIG. 5 is a flow chart describing example methods of facilitating cross-medium transactions using the on-demand liquidity and volatility resolution techniques described herein. Referring to FIG. 5, the computing system 300 can include a network communication interface 310 to communicate, over one or more networks 380, with client devices 396 executing a transaction service application 397, and computing systems of exchanges 390, each implementing conversions between a home value medium and a digital currency. In various implementations, the computing system 300 can receive, over the one or more networks 380, a cross-medium transaction request from a sending client (e.g., individual users 395 or client institutions 375) (500). In certain examples, the transaction request can indicate an original value amount in an originating value medium (502), a destination value medium, and a receiving client (e.g., a receiving user 395 or client institution 375 in a different country) (504). As provided herein, the originating value medium can comprise a first fiat currency, and the destination value medium can comprise a second fiat currency. In variations, the exchanges can comprise entities that specialize in exchanging any asset class of value into another asset class of value (e.g., stocks, bonds, commodities, fiat currencies, cryptocurrencies, real estate, treasuries, goods, services, etc.).

Based on the originating value medium and the destination value medium, the computing system 300 can establish network communications with an originating exchange 390 and a destination exchange 390 (505). For example, the network communications can comprise a secure and dedicated format or schema that is specific to the cross-medium transaction service. In certain examples, the transaction request from the sending client can comprise a quote request for an exchange rate between the originating value medium and the destination value medium.

Using the established network communications, the computing system 300 can transmit exchange rate quote requests to both the originating exchange 390 and the destination exchange 390 (510), and receive exchange rate quotes from both exchanges accordingly (515). The exchange rate quote from the originating exchange 390 can comprise an exchange rate for converting from the originating value medium to a digital currency utilized by the cross-medium transaction service (517). The exchange rate quote from the destination exchange 390 can comprise an exchange rate for converting the digital currency to the destination value medium (519).

Based on the exchange rate quotes, the computing system 300 can generate a guaranteed exchange rate for the sending and receiving clients, and transmit the guaranteed exchange rate to at least the sending client (520). In certain examples, the guaranteed exchange rate may be forwarded to both the sending and receiving clients, and require authorizations from both before executing the transaction. According to various implementations, based on a confirmation from at least the sending client, the computing system 300 can generate and transmit, over the one or more networks 380, a first set of transaction instructions to the originating exchange 390 and a second set of transaction instructions to the destination exchange 390 (525). The first set of transaction instructions can cause the originating exchange 390 to (i) convert the value amount in the originating value medium to a corresponding value amount in a digital currency, and (ii) transfer the corresponding value amount in the digital currency to the destination exchange 390. In many implementations, the second set of instructions can cause the destination exchange to (i) convert the corresponding amount in the digital currency to a corresponding value amount in the destination value medium, and (ii) transfer the corresponding value amount in the destination value medium to an account of the receiving client.

However, it is contemplated that a deviation between a guaranteed amount corresponding to the guaranteed exchange rate and an actual transferred amount may exist due to exposure to transaction volatility over a period of time between receiving the transaction request and the transfer of the corresponding value amount in the destination value medium to the account of the receiving client. To address, this volatility deviation, the computing system 300 can maintain a client pool of the digital currency at the destination exchange 390, which the computing system 300 can occasionally top-up manually when needed, and/or the client pool may be automatically balanced through natural positive and negative deviations in the transferred amounts versus guaranteed amounts.

According to examples, the computing system 300 can receive, over the one or more networks 380, a status update from the destination exchange 390, and determined whether the transferred value amount matches a guaranteed value amount corresponding to the guaranteed exchange rate (530). If so (532), then the computing system 300 can receive a transaction confirmation from the receiving client indicating that the transfer and conversion was successful, and transmit a settlement confirmation to the sending client accordingly (535). However, if the status update from the destination exchange 390 indicates a deviation from the original value amount (534), the computing system 300 can determine a slippage amount in digital currency to match the guaranteed amount (540), and transmit an offset instruction to the destination exchange 390, causing the destination exchange 390 to utilize the client pool to offset the deviation by an offset amount of the digital currency such that the corresponding value amount in the destination value medium equates to the original value amount in the originating value medium based on a guaranteed exchange rate provided by the computing system 300 (545). In such a scenario, the deviation corresponds to a value difference between the value amount in the digital currency and correct amount of the digital currency based on the guaranteed exchange rate, and the offset amount compensates for the deviation to provide the guaranteed exchange rate to the sending and receiving clients. The computing system 300 may then receive a transaction settlement confirmation from the receiving client, indicating that the conversion was successful and the correct amount was deposited (550).

In certain implementations, the client pool of the digital currency at the destination exchange 390 can be utilized by the computing system 300 for volatility deviations in cross-medium transactions for all receiving clients associated with the destination value medium. In variations, the pool of the digital currency at the destination exchange 390 can comprises a slippage balance in an account of the receiving client. This case, the slippage balance in each account of each receiving client can be dedicated solely for volatility deviations in cross-medium transactions involving the receiving client.

Figure 6:
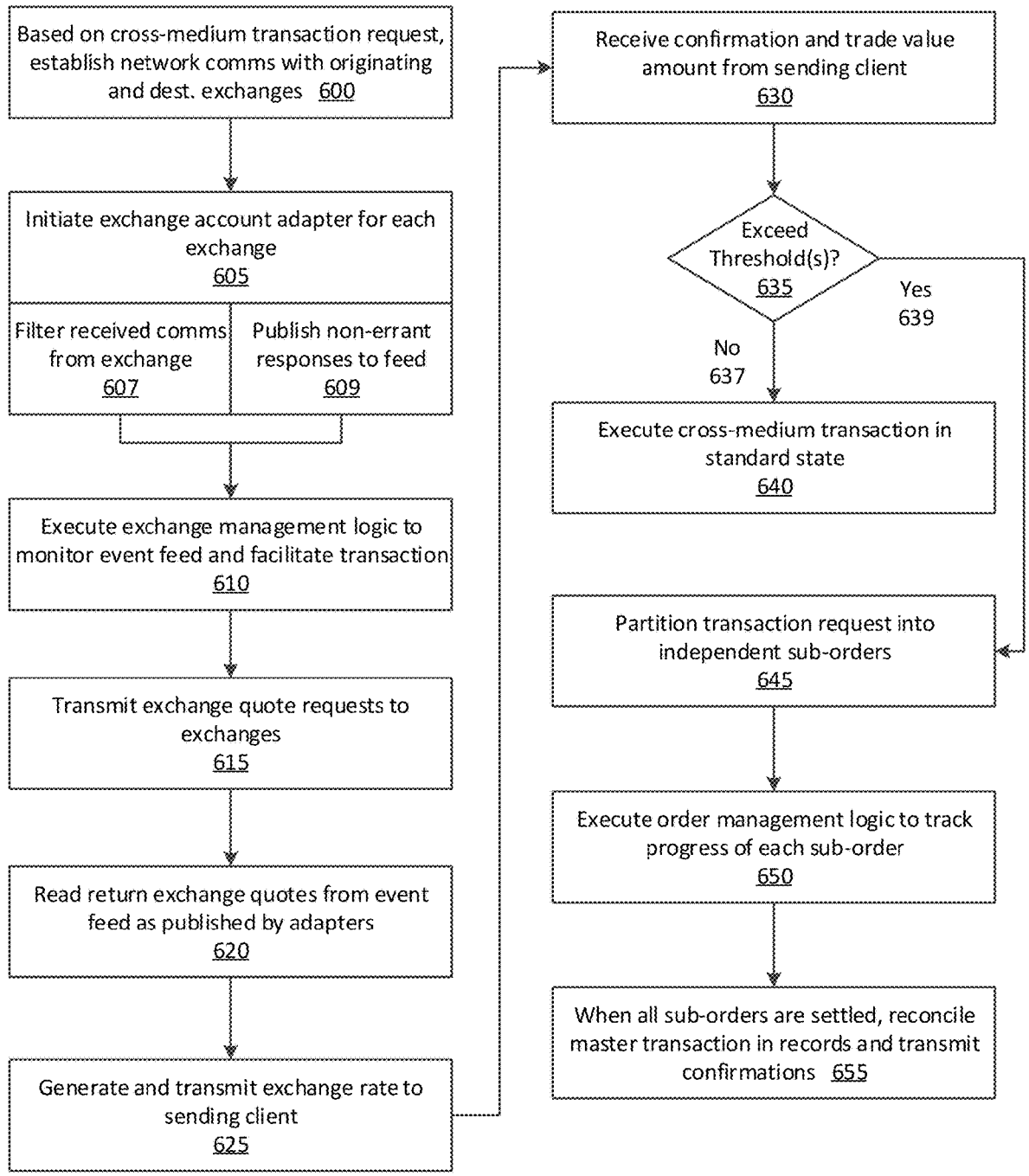
FIG. 6 is a flow chart describing example methods of executing order management and asynchronous exchange interactions to prevent failed transactions, according to various implementations.

FIG. 6 is a flow chart describing example methods of executing order management and asynchronous exchange interactions to prevent failed transactions, according to various implementations. Referring to FIG. 6, the computing system 300 can receive a cross-medium transaction request from a sending client, and establish network communications with an originating exchange and a destination exchange based on the details of the request (600). In establishing the network communications, the computing system 300 can transmit and receive communications asynchronously with the originating exchange and the destination exchange by initiating a first exchange account adapter 345 to receive and filter communications from the originating exchange, and a second exchange account adapter 345 to receive and filter communications from the destination exchange (605).

In various examples, the first exchange account adapter 345 can be specific to an account of the sending client at the originating exchange 390 and the second exchange account adapter 345 can be specific to an account of the receiving client at the destination exchange 390. Furthermore, each exchange account adapter can comprise a computer program specific for filtering received communications from a respective exchange 390 (607) and publishing only non-errant communications or responses from the exchange 390 to an event feed 348 (609). Accordingly, the first exchange account adapter can publish non-errant messages from the originating exchange 390 to the event feed 348, and the second exchange account adapter can publish non-errant messages from the destination exchange 390 to the event feed 348.

According to examples provided herein, the computing system 300 can execute exchange management logic to monitor the event feed 348 and communicate with the originating and destination exchanges 390 based at least in part on information published to the event feed 348 by the first and second exchange account adapters to facilitate the transaction (610). In further examples, the transaction request can comprise a quote request for an exchange rate to transfer a value amount in an originating value medium to a receiving client in a destination value medium. The executed exchange management logic can cause the computing system 300 to process the quote request by transmitting corresponding quote requests to the originating exchange 390 and the destination exchange 390 (615), and reading the exchange rate quotes from both the originating exchange 390 and the destination exchange 390 in the event feed 348 as published by the first and second exchange account adapters 345 (620).

The computing system 300 may then generate exchange rate information indicating an exchange rate (e.g., a guaranteed exchange rate) to convert the value amount in the originating value medium to the destination value medium and transfer the resultant amount to the receiving client, and transmit this information to at least the sending client (625). According to examples, the executed exchange management logic can further cause the computing system 300 to receive an acceptance message from the sending client indicating an exchange transaction in a specified value amount to the receiving client and conversion from the originating value medium to the destination value medium (630). In certain scenarios, one or more of the exchanges 390 may not have the capacity to handle large "master" transaction about a certain threshold.

Thus, the computing system 300 can determine whether the request amount to be converted and transferred exceeds one or more thresholds (635). For example, a threshold transaction amount can be specific to a particular exchange 390, or can be general for all exchanges (e.g., a capacity threshold of the cross-medium transaction service). If the transaction amount does not exceed the threshold(s) (637), then the computing system can execute the cross-medium transaction in a standard state, as described by examples throughout the present application (640). However, if the transaction amount does exceed the threshold(s)) (639), then the computing system 300 can partition the exchange transaction into a plurality of sub-orders and process each sub-order separately with the originating and destination exchanges 390 (645). Based on partitioning the exchange transaction into the plurality of sub-orders, the computing system 300 can execute order management logic to generate a record for each sub-order and track each sub-order until the sub-order is settled by the destination exchange 390 (650). Accordingly, when all orders are settled, the computing system 300 can reconcile the master transaction in the records (e.g., internal records or decentralized ledger 370), and transmit a confirmation message to the sending client indicating settlement of the exchange transaction (655).

Figure 7:
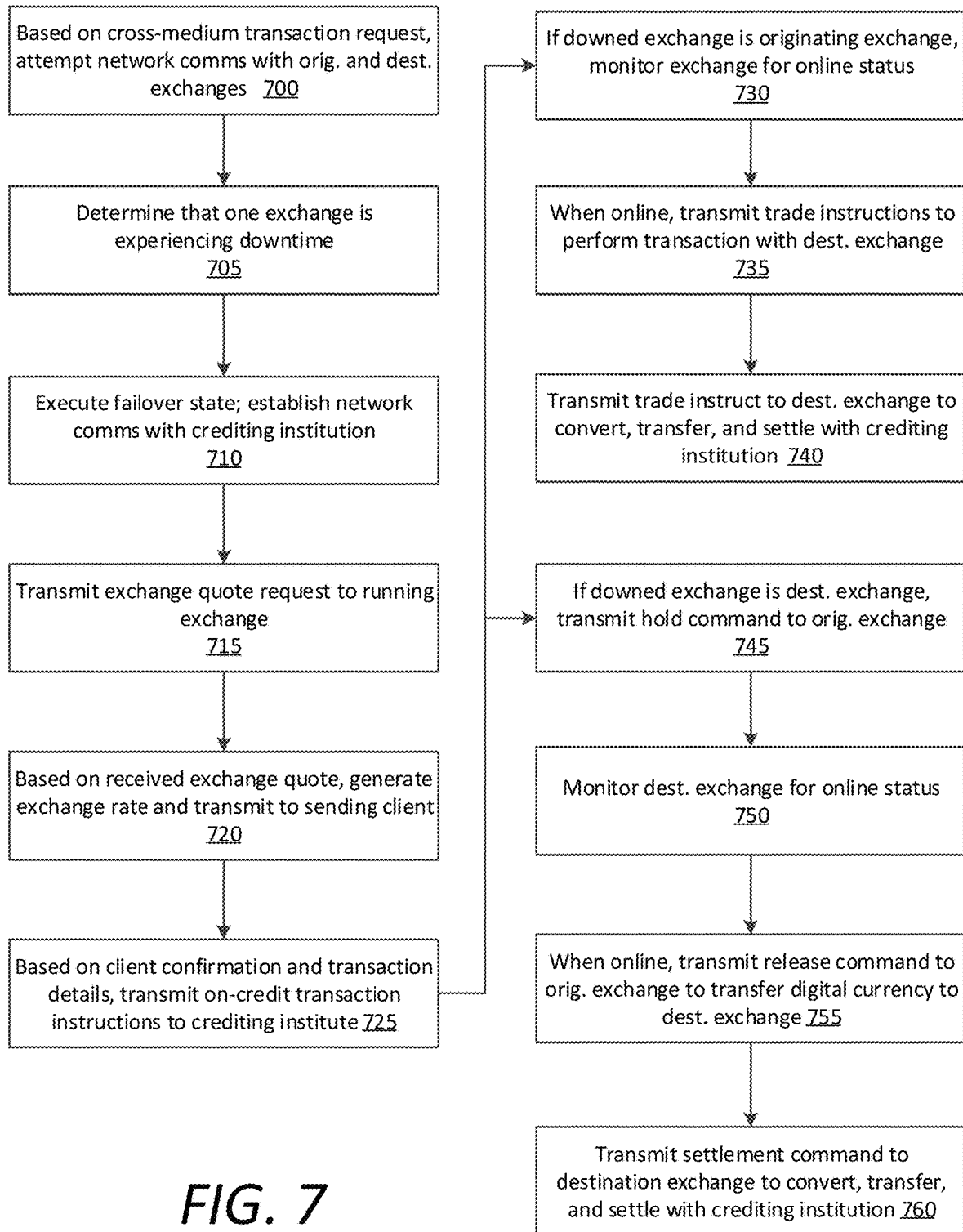
FIG. 7 is a flow chart describing example methods of initiating a failover state to mitigate exchange infrastructure downtime or failures, according to certain examples described herein.

FIG. 7 is a flow chart describing example methods of initiating a failover state to mitigate exchange infrastructure downtime or failures, according to certain examples described herein. Referring to FIG. 7, based on a transaction request from a sending client, the computing system 300 can attempt to establish network communications with an originating exchange 390 and a destination exchange 390 (700). In any given time, the computing system 300 can determine that one of the originating exchange 390 or the destination exchange 390 is experiencing downtime as a downed exchange 394 (705). Based on determining the downed exchange 394, the computing system 300 can initiate a failover state and establish network communications with a crediting institution 377 to bypass the downed exchange 394 and facilitate the transaction request (710).

In various examples, the computing system 300 can transmit an exchange quote request based on the sending client's transaction request to the running exchange, and receive an exchange rate quote (715) (e.g., to either convert from the originating value medium to the digital currency or to convert the digital currency to the destination value medium, depending on which exchange is down). Based on the received exchange quote from the running exchange 390, the computing system 300 can generate an exchange rate (e.g., a guaranteed exchange rate), and transmit the exchange rate information to the sending client (720). In certain implementations, the exchange rate information may be based on historical data and/or a current volatility of the digital currency, the originating value medium, and/or the destination value medium. Based on client confirmation and transaction details, the computing system 300 may then transmit on-credit transaction instructions to the crediting institution 377 to transfer the exchange amount requested by the sending client to an account of the receiving client in the destination value medium (e.g., a destination currency), thereby settling the transaction on credit (725).

To settle the debt with the crediting institution, the computing system 300 can perform a number of functions depending upon which exchange 390 was experiencing downtime. For example, if the downed exchange 394 is the originating exchange, the computing system 300 can monitor the exchange 390 for an online status (730). When the originating exchange 390 comes back online, the computing system 300 can transmit trade instructions to the originating exchange 390 to perform the exchange transaction with the destination exchange 390 in accordance with the examples described herein (735). In certain examples, the computing system 300 may then transmit trade instructions to the destination exchange 390 to convert, transfer, and settle the on-credit amount with the crediting institution 377 (740). In variations, the computing system 300 can independently (e.g., either manually or automatically) settle the on-credit transaction with the crediting institution 377 and subsequently settle the transaction amount with the previous downed originating or destination exchange 390.

If the downed exchange 394 comprises the destination exchange 390, the computing system 300 can transmit transaction instructions to the originating exchange 390, causing the originating exchange to place a hold on transferring digital currency to the downed destination exchange 394 (745). In some aspects, the transaction instructions can further cause the originating exchange 390 to convert the value amount of the sending client in the originating value medium to digital currency prior to placing the hold. In variations, the hold command can cause the originating exchange 390 to hold the exchange amount in the originating value medium, and await conversion until the downed destination exchange 394 is back online. The computing system 300 may then monitor the down destination exchange 394 for an online status (750). When the destination exchange is back online, the computing system 300 can receive an online confirmation that the downed destination exchange 394 is back online.

In response to the online confirmation, the computing system 300 can terminate the failover state by transmitting a release command to the originating exchange 390, causing the originating exchange to transfer digital currency corresponding to the exchange value amount to the destination exchange 390 (755). The computing system 300 may then transmit a settlement command to the destination exchange 390, the causing the destination exchange 390 to convert the transferred digital currency to a converted amount in the destination value medium, and transfer the converted amount of the destination value medium to the crediting institution in order to at least partially reconcile the credit request (760). In variations, the computing system 300 can independently (e.g., either manually or automatically) settle the on-credit transaction with the crediting institution 377 and subsequently settle the transaction amount with the previously downed originating or destination exchange 390.

Figure 8:
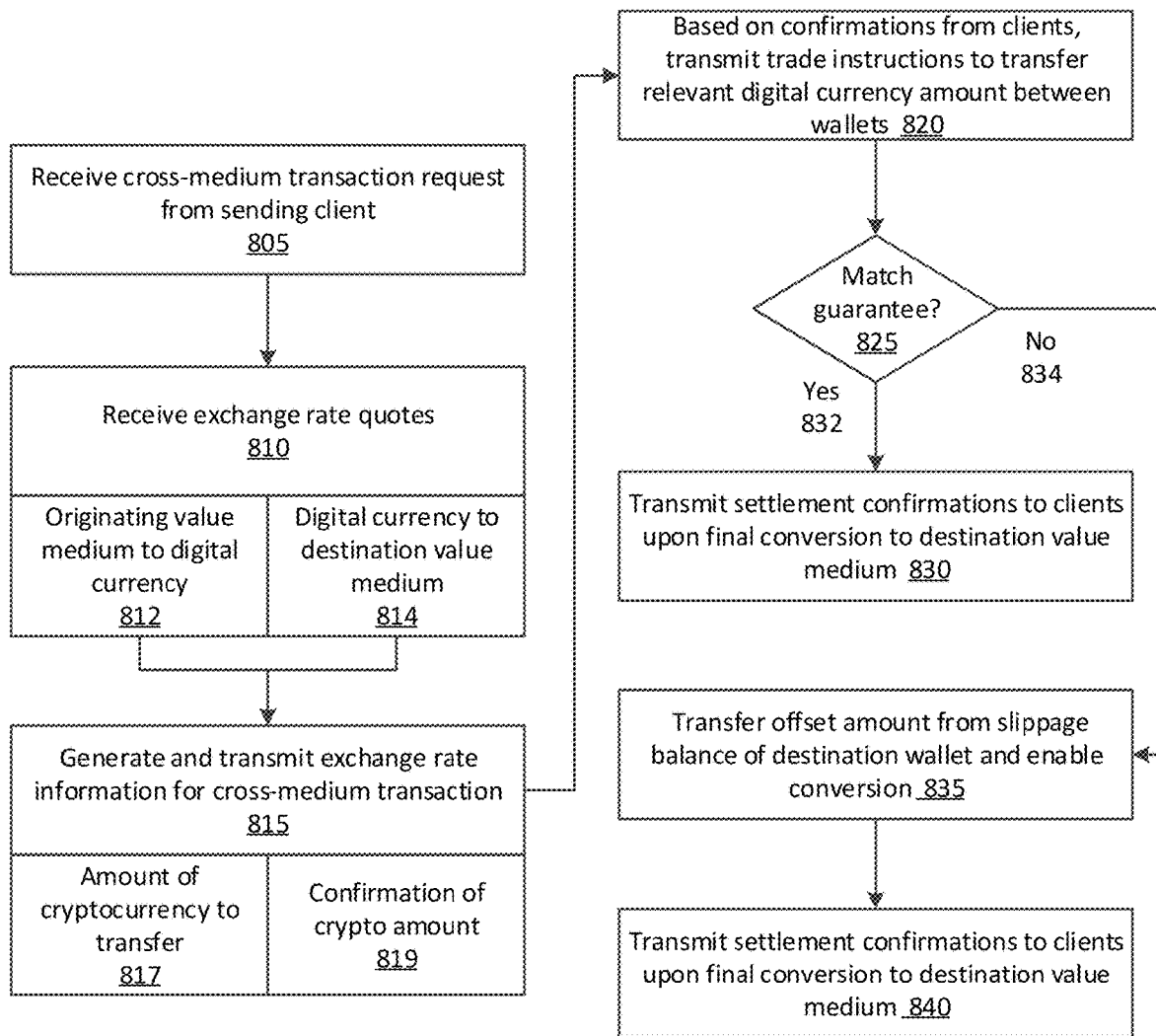
FIG. 8 is a flow chart describing an example method of facilitating client-to-client cross-medium exchange through the use of hot wallets in order to circumvent exchanges, according to examples provided herein.

FIG. 8 is a flow chart describing an example method of facilitating client-to-client cross-medium exchange through the use of hot wallets in order to circumvent exchanges, according to examples provided herein. Referring to FIG. 8, the computing system 300 can receive a transaction request from a computing device 396 of a sending client of the cross-medium transaction service (805). Based at least in part on the transaction request, the computing system 300 can receive exchange quotes (e.g., from the sending and receiving clients, or marketplace data indicating current supply/demand exchange rates from a third-party entity) (810). In certain examples, the exchange rate quote from the sending client can indicate an exchange rate (e.g., a guaranteed exchange rate) for converting the originating value medium to the digital currency (812), and the exchange quote from the receiving client can comprise an exchange rate quote to convert the digital currency to the destination value medium (814). In variations, the computing system 300 can determine a guaranteed exchange rate based on exchange rate quotes received or determined from the marketplace data.

In some examples, the computing system 300 may then generate and transmit exchange rate information for converting the originating value medium to the destination value medium to the computing device 396 of the sending client and/or the receiving client (815). In certain implementations, the exchange rate information to the sender can indicate an amount of cryptocurrency to transfer from the wallet of the sender to the wallet of the receiver (817). Additionally, the exchange rate information to the receiver can comprise a confirmation of the amount of cryptocurrency to be received in the receiver's wallet (819). The computing system 300 may then receive a confirmation from the computing device of the sending client and/or the receiving client comprising an authorization to perform an exchange transaction to transfer a value amount in the originating value medium to the receiving client for conversion to the destination value medium. Upon receiving the confirmation(s), the computing system 300 can transmit trade instructions to the sending client to transfer the agreed-upon amount of cryptocurrency from the digital wallet 344 of the sending client to a digital wallet of the receiving client (820).

In various implementations, the corresponding amount of the digital currency can correspond to a current exchange rate between the originating value medium and the digital currency. In certain examples, the computing system 300 can determine whether the transferred amount matches or aligns with a guaranteed exchange rate (825). Specifically, it is contemplated that even though the time period for the exchange may last for a matter of seconds, this time period can still expose the exchange transaction to exchange rate volatility. In such examples, if the amount does align with the guaranteed exchange rate (832), then the computing system 300 can transmit settlement confirmations to the clients upon final conversion to the destination value medium and transfer to an account of the receiving client (830).

However, if the transferred amount does not align with the guaranteed exchange rate (834), then in certain implementations, the computing system 300 can transfer an offset amount from the slippage balance of the destination wallet 344 of the receiving client to enable the proper conversion (835). As described herein, each digital wallet 344 of each client of the cross-medium transaction service can include a slippage balance used solely for compensating for exchange rate volatility. As further described herein, the computing system 300 can transfer the offset amount to or from the slippage balance of the digital wallet 344 of the receiving client such that a final conversion amount of the digital currency to the destination value medium aligns with the guaranteed exchange rate. Thereafter, the receiving client can access the destination digital wallet 344 and convert the corresponding amount of the digital currency to the destination value medium to settle the exchange transaction. The computing system 30 may then transmit settlement confirmations to the sending and/or receiving clients upon final conversion to the destination value medium (840).

Subsequent to finalizing the exchange transaction, the computing system 300 can determine whether the slippage balance of the digital wallet 344 of the receiving client has dropped below a utilization threshold specific to the receiving client. In such examples, the utilization threshold of the receiving client can correspond to a percentage of a total exchange transaction amount of the receiving client over a certain time period (e.g., each day or week). In response to determining that the slippage balance of the digital wallet 344 of the receiving client has dropped below the utilization threshold specific to the receiving client, the computing system 300 can transfer a top-up amount of digital currency from an internal digital wallet of the transaction service to the digital wallet 344 of the receiving client.

It is contemplated that facilitation of direct client-to-client exchange also enables each client to perform treasury management functions using a local exchange, as described herein. Accordingly, each client can configure its own risk tolerance by setting cryptocurrency risk exposure, liquidity, and either manually or automatically converting cryptocurrency to a local value medium at a local exchange accordingly. Thus, if more liquidity is required, the client can convert the local value medium to the cryptocurrency at the local exchange. However, if less volatility risk is needed the client can convert the cryptocurrency to the local value medium at the local exchange.

Hardware Diagram

Figure 9:
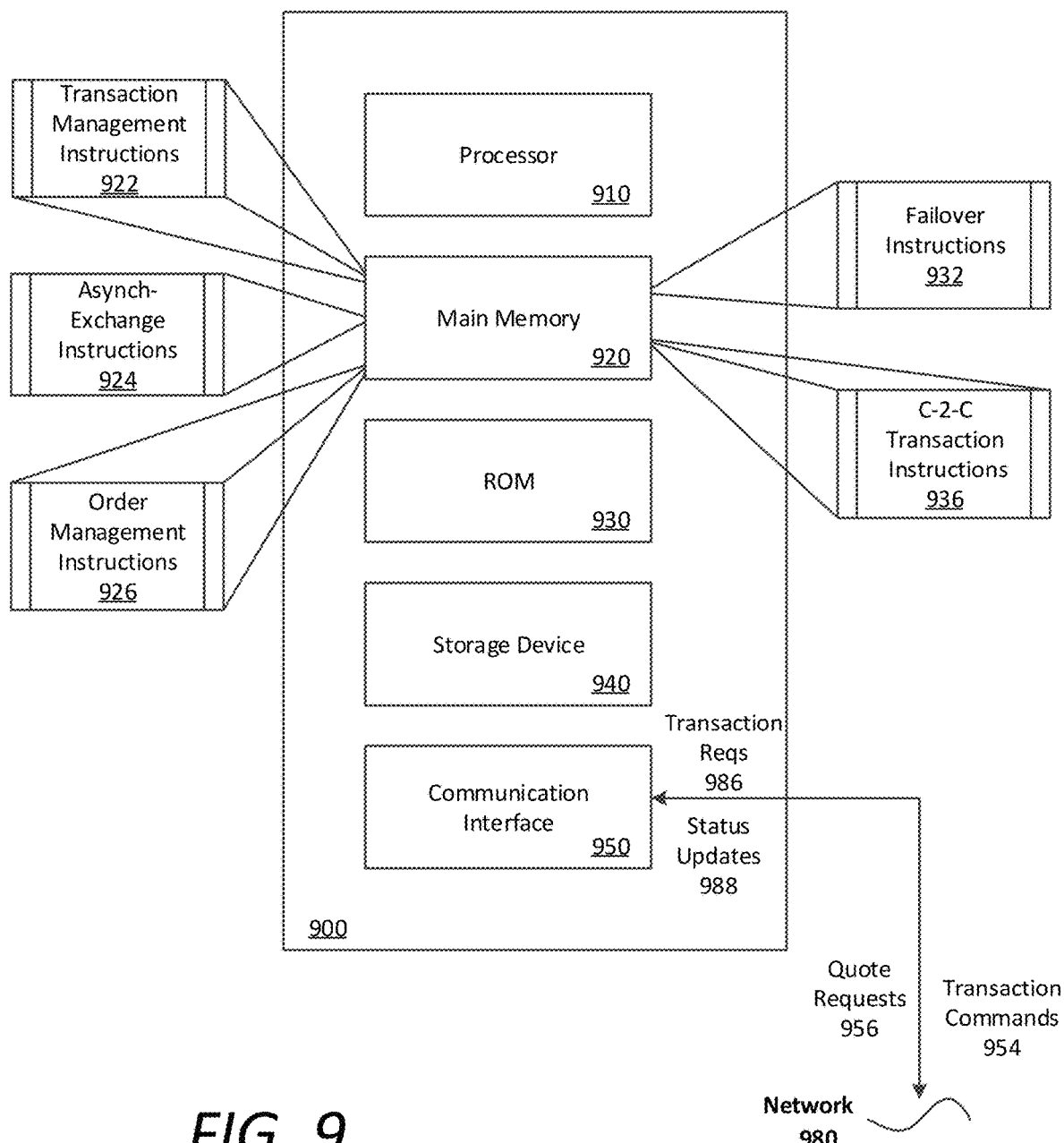
FIG. 9 is a hardware diagram illustrating a computer system upon which examples described herein may be implemented.

FIG. 9 is a hardware diagram illustrating a computer system upon which examples described herein may be implemented. A computer system 900 can be implemented on, for example, a server or combination of servers. For example, the computer system 900 may be implemented as part of a network service for providing transaction services. In the context of FIGS. 1-4, the transaction computing system 140, 210, 300, 490 may be implemented using one or more computer systems 900 such as described by FIG. 9.

In one implementation, the computer system 900 includes processing resources 910, a main memory 920, a read-only memory (ROM) 930, a storage device 940, and a communication interface 950. The computer system 900 includes at least one processor 910 for processing information stored in the main memory 920, such as provided by a random-access memory (RAM) or other dynamic storage device, for storing information and instructions which are executable by the processor 910. The main memory 920 also may be used for storing temporary variables or other intermediate information during execution of instructions to be executed by the processor 910. The computer system 900 may also include the ROM 930 or other static storage device for storing static information and instructions for the processor 910. A storage device 940, such as a magnetic disk or optical disk, is provided for storing information and instructions.

The communication interface 950 enables the computer system 900 to communicate over one or more networks 980 (e.g., cellular or Wi-Fi network) through use of the network link (wireless or wired). Using the network link, the computer system 900 can communicate with one or more computing devices, one or more servers, and/or client transaction terminals. The executable instructions in the memory 920 can include instructions 922, which the computer system 900 can implement the transaction service, facilitating cross-medium exchanges using the on-demand liquidity and volatility resolution techniques, as described throughout the present disclosure. Specifically, execution of the transaction management instructions 922 enables the computer system 900 to receive transaction requests 986 from clients, transmit quote requests 956 and transaction commands 954 to exchanges, receive status updates 988, and respond to the updates accordingly.

The executable instructions stored in memory 920 can also include asynchronous exchange instructions 924, which the computer system 900 can execute to initiation exchange account adapters to filter and publish incoming communications from exchanges, as described herein. The executable instructions can further include order management instructions 926, which the computer system 900 can execute to break up master transaction requests and track and reconcile each sub-order in accordance with examples described herein.

The executable instructions can further include failover instructions 932, which the processor 910 can execute to detect downed exchanges and initiate a failover state to mitigate such exchange infrastructure downtime or failures by engaging with crediting institutions at destinations, according to certain examples described herein. The instructions stored in memory 920 can further include client-to-client transaction instructions 936 in order to facilitate direct client-to-client cross-medium exchange through the use of digital wallets, thereby circumventing exchanges, as described herein.

The processor 910 is configured with software and/or other logic to perform one or more processes, steps and other functions described with implementations, such as described with respect to FIGS. 1-8, and elsewhere in the present application. Examples described herein are related to the use of the computer system 900 for implementing the techniques described herein. According to one example, those techniques are performed by the computer system 900 in response to the processor 910 executing one or more sequences of one or more instructions contained in the main memory 920. Such instructions may be read into the main memory 920 from another machine-readable medium, such as the storage device 940. Execution of the sequences of instructions contained in the main memory 920 causes the processor 910 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A network-based computing system implementing a cross-medium transaction service, comprising:

a network communication interface to communicate, over one or more networks, with computing systems of exchanges each implementing conversions between a home value medium and a digital currency;

one or more processors; and a memory storing instructions that, when executed by the one or more processors, cause the computing system to:

based on a transaction request from a sending client, establish network communications with an originating exchange and a destination exchange;

transmit and receive communications asynchronously with the originating exchange and the destination exchange by:

initiating a first exchange account adapter to receive and filter communications from the originating exchange, wherein the first exchange account adapter comprises a first filtering program that automatically (i) filters errant messages from the originating exchange that can cause a failed transaction, and (ii) publishes non-errant messages from the originating exchange to an event feed; and initiating a second exchange account adapter to receive and filter communications from the destination exchange, wherein the second exchange account adapter comprises a second filtering program that automatically (i) filters errant messages from the destination exchange that can cause a failed transaction, and (ii) publishes non-errant messages from the destination exchange to the event feed;

wherein the computing system executes exchange management logic to perform polling on the event feed to monitor the event feed and communicate with the originating and destination exchanges based at least in part on information published to the event feed by the first and second exchange account adapters; and wherein the first exchange account adapter is specific to an account of the originating exchange corresponding to the sending client, wherein the second exchange account adapter is specific to an account of the destination exchange corresponding to a receiving client, and wherein the polling is decoupled from publishing the information on the event feed by the first and second exchange account adapters.

2. The computing system of claim 1, wherein the transaction request comprises a quote request for an exchange rate to transfer a value amount in an originating value medium to the receiving client in a destination value medium.

3. The computing system of claim 2, wherein the executed exchange management logic causes the computing system to process the quote request by transmitting corresponding quote requests to the originating exchange and the destination exchange, and reading the exchange quotes from both the originating exchange and the destination exchange in the event feed as published by the first and second exchange account adapters.

4. The computing system of claim 2, wherein the executed exchange management logic further causes the computing system to receive an acceptance message from the sending client indicating an exchange transaction in the value amount to the receiving client and conversion from the originating value medium to the destination value medium.

5. The computing system of claim 4, wherein the executed exchange management logic further causes the computing system to:

determine that the value amount exceeds a capacity threshold of the cross-medium transaction service;

based on the value amount exceeding the capacity threshold, partition the exchange transaction into a plurality of sub-orders and process each sub-order separately with the originating and destination exchanges.

6. The computing system of claim 5, wherein the executed instructions further cause the computing system to:

based on partitioning the exchange transaction into the plurality of sub-orders, execute order management logic to generate a record for each sub-order and track each sub-order until the sub-order is settled by the destination exchange.

7. The computing system of claim 6, wherein the executed order management logic further causes the computing system to:

when all sub-orders are settled, transmit a confirmation message to the sending client indicating settlement of the exchange transaction.

8. A non-transitory computer readable medium storing instructions that, when executed by one or more processors of a computing system, cause the computing system to:

communicate, over one or more networks, with computing systems of exchanges each implementing conversions between a home value medium and a digital currency;

based on a transaction request from a sending client, establish network communications with an originating exchange and a destination exchange;

transmit and receive communications asynchronously with the originating exchange and the destination exchange by:

initiating a first exchange account adapter to receive and filter communications from the originating exchange, wherein the first exchange account adapter comprises a first filtering program that automatically (i) filters errant messages from the originating exchange that can cause a failed transaction, and (ii) publishes non-errant messages from the originating exchange to an event feed; and initiating a second exchange account adapter to receive and filter communications from the destination exchange, wherein the second exchange account adapter comprises a second filtering program that automatically (i) filters errant messages from the destination exchange that can cause a failed transaction, and (ii) publishes non-errant messages from the destination exchange to the event feed;

wherein the computing system executes exchange management logic to perform polling on the event feed to monitor the event feed and communicate with the originating and destination exchanges based at least in part on information published to the event feed by the first and second exchange account adapters; and wherein the first exchange account adapter is specific to an account of the originating exchange corresponding to the sending client, wherein the second exchange account adapter is specific to an account of the destination exchange corresponding to a receiving client, and wherein the polling is decoupled from publishing the information on the event feed by the first and second exchange account adapters.

9. The non-transitory computer readable medium of claim 8, wherein the transaction request comprises a quote request for an exchange rate to transfer a value amount in an originating value medium to the receiving client in a destination value medium.

10. The non-transitory computer readable medium of claim 9, wherein the executed exchange management logic causes the computing system to process the quote request by transmitting corresponding quote requests to the originating exchange and the destination exchange, and reading the exchange quotes from both the originating exchange and the destination exchange in the event feed as published by the first and second exchange account adapters.

11. The non-transitory computer readable medium of claim 9, wherein the executed exchange management logic further causes the computing system to receive an acceptance message from the sending client indicating an exchange transaction in the value amount to the receiving client and conversion from the originating value medium to the destination value medium.

12. The non-transitory computer readable medium of claim 11, wherein the executed exchange management logic further causes the computing system to:
  determine that the value amount exceeds a capacity threshold of the cross-medium transaction service;
  based on the value amount exceeding the capacity threshold, partition the exchange transaction into a plurality of sub-orders and process each sub-order separately with the originating and destination exchanges.

13. The non-transitory computer readable medium of claim 12, wherein the executed instructions further cause the computing system to:
  based on partitioning the exchange transaction into the plurality of sub-orders, execute order management logic to generate a record for each sub-order and track each sub-order until the sub-order is settled by the destination exchange.

14. The non-transitory computer readable medium of claim 13, wherein the executed order management logic further causes the computing system to:
  when all sub-orders are settled, transmit a confirmation message to the sending client indicating settlement of the exchange transaction.

15. A computer-implemented method of implementing a cross-medium transaction service, the method being performed by one or more processors of a computing system and comprising:
  communicating, over one or more networks, with computing systems of exchanges each implementing conversions between a home value medium and a digital currency;
  based on a transaction request from a sending client, establishing network communications with an originating exchange and a destination exchange;
  transmitting and receiving communications asynchronously with the originating exchange and the destination exchange by:
    initiating a first exchange account adapter to receive and filter communications from the originating exchange, wherein the first exchange account adapter comprises a first filtering program that automatically (i) filters errant messages from the originating exchange that can cause a failed transaction, and (ii) publishes non-errant messages from the originating exchange to an event feed; and
    initiating a second exchange account adapter to receive and filter communications from the destination exchange, wherein the second exchange account adapter comprises a second filtering program that automatically (i) filters errant messages from the destination exchange that can cause a failed transaction, and (ii) publishes non-errant messages from the destination exchange to the event feed;
  wherein the computing system executes exchange management logic to perform polling on the event feed to monitor the event feed and communicate with the originating and destination exchanges based at least in part on information published to the event feed by the first and second exchange account adapters; and
  wherein the first exchange account adapter is specific to an account of the originating exchange corresponding to the sending client, wherein the second exchange account adapter is specific to an account of the destination exchange corresponding to a receiving client, and wherein the Dolling is decoupled from publishing the information on the event feed by the first and second exchange account adapters.

16. The method of claim 15, wherein the transaction request comprises a quote request for an exchange rate to transfer a value amount in an originating value medium to the receiving client in a destination value medium.

17. The method of claim 16, wherein the executed exchange management logic causes the computing system to process the quote request by transmitting corresponding quote requests to the originating exchange and the destination exchange, and reading the exchange quotes from both the originating exchange and the destination exchange in the event feed as published by the first and second exchange account adapters.

18. The method of claim 16, wherein the executed exchange management logic further causes the computing system to receive an acceptance message from the sending client indicating an exchange transaction in the value amount to the receiving client and conversion from the originating value medium to the destination value medium.

19. The method of claim 18, further comprising:
  determining that the value amount exceeds a capacity threshold of the cross-medium transaction service;
  based on the value amount exceeding the capacity threshold, partitioning the exchange transaction into a plurality of sub-orders and process each sub-order separately with the originating and destination exchanges.

20. The method of claim 19, further comprising:
  based on partitioning the exchange transaction into the plurality of sub-orders, executing order management logic to generate a record for each sub-order and track each sub-order until the sub-order is settled by the destination exchange.

* * * * *